(12) United States Patent
French et al.

(10) Patent No.: US 11,839,298 B2
(45) Date of Patent: Dec. 12, 2023

(54) MOBILE STORAGE SYSTEM WITH ELEVATED PLATFORM

(71) Applicant: Pipp Mobile Storage Systems, Inc., Walker, MI (US)

(72) Inventors: Thomas A French, Grand Haven, MI (US); Delos A. Rockwell, Lowell, MI (US); Andrew B. Hartmann, Muskegon, MI (US)

(73) Assignee: Pipp Mobile Storage Systems, Inc., Walker, MI (US)

( * ) Notice: Subject to any disclaimer, the term of this patent is extended or adjusted under 35 U.S.C. 154(b) by 0 days.

(21) Appl. No.: 18/049,475

(22) Filed: Oct. 25, 2022

(65) Prior Publication Data

US 2023/0061415 A1 Mar. 2, 2023

Related U.S. Application Data

(63) Continuation of application No. 17/096,044, filed on Nov. 12, 2020, now Pat. No. 11,478,079.

(Continued)

(51) Int. Cl.
*A47B 53/02* (2006.01)
*B65G 1/04* (2006.01)
(Continued)

(52) U.S. Cl.
CPC ............... *A47B 53/02* (2013.01); *A47F 7/00* (2013.01); *B65G 1/04* (2013.01); *E06C 1/397* (2013.01)

(58) Field of Classification Search
CPC ..... A47B 57/40; A47B 57/402; A47B 57/404; A47B 53/02; B65G 1/04; B65G 1/00;
(Continued)

(56) References Cited

U.S. PATENT DOCUMENTS

| 1,323,511 A | 12/1919 | Welch |
| 1,694,528 A | 12/1928 | Clarkson |

(Continued)

FOREIGN PATENT DOCUMENTS

| FR | 1227701 | 8/1960 | |
| GB | 2097087 A | * 10/1982 | ........... A47B 57/402 |
| WO | WO2019003201 | 1/2019 | |

*Primary Examiner* — Patrick D Hawn
(74) *Attorney, Agent, or Firm* — Gardner, Linn, Burkhart & Ondersma LLP

(57) ABSTRACT

A movable storage assembly includes a pair of upright frame pieces joined together by a lateral rail. The rail's opposite ends each include a T-shaped upper tab having upward and downward extending portions, and a lower tab with downwardly extending portion. The upper and lower tabs are simultaneously insertable into upper and lower openings along the uprights, and then lowerable so that the downward portions of the upper and lower tabs secure the rail to the uprights. Upward movement of the rail causes the upward portions of the upper tabs of engage the uprights above the upper openings, preventing removal of the upper tabs from the uprights. Optionally, part of a platform is supportable at the rail and cooperates with the upper tabs to prevent removal of the lateral rail from the uprights, even if the downwardly extending portions of the tabs are disengaged from the uprights.

18 Claims, 28 Drawing Sheets

Related U.S. Application Data

(60) Provisional application No. 62/934,742, filed on Nov. 13, 2019.

(51) Int. Cl.
*E06C 1/397* (2006.01)
*A47F 7/00* (2006.01)

(58) Field of Classification Search
CPC ...... B65G 1/023; B65G 1/026; B65G 1/0457; B65G 1/0492; B65G 1/10; B65G 1/02; B65G 1/06; A47F 7/00; E06C 1/397; E06C 1/39
USPC .................................................. 211/191, 192
See application file for complete search history.

(56) References Cited

U.S. PATENT DOCUMENTS

| | | | |
|---|---|---|---|
| 1,858,086 A | 5/1932 | House | |
| 2,166,704 A | 7/1939 | Foulkes | |
| 2,551,345 A | 5/1951 | Scott | |
| 2,590,040 A | 3/1952 | Rose | |
| 2,772,639 A | 12/1956 | Ingold | |
| 2,812,069 A | 11/1957 | Trammell | |
| 2,836,129 A | 5/1958 | Jaeger | |
| 2,895,619 A * | 7/1959 | Frazier | A47B 57/404 403/345 |
| 2,915,195 A | 12/1959 | Crosby | |
| 3,009,582 A * | 11/1961 | Degener | A47B 57/402 211/134 |
| 3,047,095 A | 7/1962 | Bell et al. | |
| 3,094,363 A | 6/1963 | Fremstad et al. | |
| 3,180,280 A | 4/1965 | Kuch et al. | |
| 3,198,592 A | 8/1965 | Zippel | |
| 3,427,085 A | 2/1969 | Staller | |
| 3,434,566 A | 5/1969 | Miller | |
| 3,535,009 A | 10/1970 | Cain | |
| 3,558,152 A | 1/1971 | Miles et al. | |
| 3,563,180 A | 2/1971 | Rutledge | |
| 3,567,299 A | 3/1971 | Lundqvist | |
| 3,575,299 A * | 4/1971 | O'Dette | A47B 57/402 211/192 |
| 3,625,372 A * | 12/1971 | MacKenzie | A47B 57/402 211/191 |
| 3,637,086 A * | 1/1972 | Klein | A47B 57/482 5/296 |
| 3,640,595 A | 2/1972 | Staller et al. | |
| 3,654,879 A * | 4/1972 | Ferdinand | F16B 7/046 108/193 |
| 3,724,389 A | 4/1973 | Greaves | |
| 3,743,115 A | 7/1973 | Saul, Jr. et al. | |
| 3,757,967 A | 9/1973 | Colbridge | |
| 3,762,335 A | 10/1973 | Baker, Jr. et al. | |
| 3,782,293 A | 1/1974 | Donohue et al. | |
| 3,801,176 A | 4/1974 | Higbee | |
| 3,865,446 A | 2/1975 | Mastronardi | |
| 3,923,354 A | 12/1975 | Young | |
| 3,944,309 A | 3/1976 | Taniwaki | |
| 3,945,510 A | 3/1976 | Saul, Jr. et al. | |
| 3,967,868 A | 7/1976 | Baker, Jr. | |
| 4,017,131 A | 4/1977 | Camenisch | |
| 4,027,453 A * | 6/1977 | Bridge | A47B 57/402 211/186 |
| 4,064,996 A * | 12/1977 | Shillum | A47B 57/402 108/107 |
| 4,092,031 A | 5/1978 | Greer et al. | |
| 4,192,564 A | 3/1980 | Losert | |
| 4,229,135 A | 10/1980 | Malmros | |
| 4,256,355 A | 3/1981 | Yamaguchi et al. | |
| 4,307,922 A | 12/1981 | Rhodes, Jr. | |
| 4,341,313 A | 7/1982 | Doring | |
| 4,379,602 A | 4/1983 | Iemura et al. | |
| 4,412,772 A | 11/1983 | Naito et al. | |
| 4,417,524 A | 11/1983 | Quinn et al. | |
| 4,418,627 A | 12/1983 | Baker | |
| 4,421,239 A * | 12/1983 | Vargo | A47B 57/404 403/219 |
| 4,427,244 A | 1/1984 | Castagna | |
| 4,462,500 A | 7/1984 | Konstant et al. | |
| 4,547,026 A | 10/1985 | French et al. | |
| 4,549,777 A | 10/1985 | Schindler | |
| 4,597,615 A | 7/1986 | Steger | |
| 4,618,191 A | 10/1986 | Peterman | |
| 4,708,411 A | 11/1987 | Peterman | |
| 4,712,696 A * | 12/1987 | Klein | A47B 57/402 211/183 |
| 4,724,640 A | 2/1988 | Patane | |
| 4,789,210 A | 12/1988 | Weiss et al. | |
| 4,802,622 A | 2/1989 | Homan | |
| 4,807,765 A | 2/1989 | Brown et al. | |
| 4,911,507 A | 3/1990 | Leist | |
| 4,988,251 A | 1/1991 | Kinney | |
| 5,004,304 A | 4/1991 | Segerpalm et al. | |
| 5,013,101 A | 5/1991 | Muth | |
| 5,069,513 A | 12/1991 | Farrell et al. | |
| 5,072,838 A | 12/1991 | Price, Jr. et al. | |
| 5,148,889 A | 9/1992 | Fenwick et al. | |
| 5,160,189 A | 11/1992 | Johnston et al. | |
| 5,205,627 A | 4/1993 | Davison et al. | |
| 5,226,549 A | 7/1993 | Price, Jr. et al. | |
| 5,265,739 A | 11/1993 | Price, Jr. et al. | |
| 5,265,971 A | 11/1993 | Duc | |
| 5,341,944 A | 8/1994 | Latino | |
| 5,348,169 A | 9/1994 | Allen | |
| 5,360,262 A | 11/1994 | Davidian | |
| 5,366,335 A | 11/1994 | Tokiwa | |
| 5,403,109 A | 4/1995 | Johnson et al. | |
| 5,413,191 A | 5/1995 | Kerr | |
| 5,435,639 A | 7/1995 | Smits et al. | |
| 5,439,281 A | 8/1995 | Croker | |
| 5,480,002 A | 1/1996 | Kerr | |
| 5,482,422 A | 1/1996 | Hammond | |
| 5,597,217 A | 1/1997 | Hoska et al. | |
| 5,624,166 A | 4/1997 | Theken et al. | |
| 5,669,682 A | 9/1997 | Janson | |
| 5,683,155 A | 11/1997 | Samo | |
| 5,685,664 A | 11/1997 | Parham et al. | |
| 5,823,700 A | 10/1998 | Poworoznek | |
| 5,848,713 A | 12/1998 | Allen | |
| 5,964,361 A | 10/1999 | Mefford et al. | |
| 6,042,321 A | 3/2000 | Labell | |
| 6,112,915 A | 9/2000 | Lewis | |
| 6,112,917 A | 9/2000 | Baker et al. | |
| 6,158,601 A | 12/2000 | Baker et al. | |
| 6,619,427 B1 | 9/2003 | Kerr | |
| 6,655,532 B1 | 12/2003 | Kitanaka et al. | |
| 7,204,343 B1 | 4/2007 | Seaman | |
| 7,757,813 B2 | 7/2010 | Kerr | |
| 7,810,656 B2 | 10/2010 | Lewis et al. | |
| 8,672,148 B2 | 3/2014 | Krummell et al. | |
| 9,408,461 B2 | 8/2016 | Knoll | |
| 9,435,156 B2 | 9/2016 | Kerr | |
| 9,999,300 B2 | 6/2018 | Iellimo | |
| 10,106,293 B2 | 10/2018 | Clark | |
| 10,314,392 B2 | 6/2019 | Iellimo | |
| 10,450,136 B2 | 10/2019 | Schroer | |
| 10,709,267 B2 * | 7/2020 | Kologe | A47B 57/42 |
| 11,141,005 B2 * | 10/2021 | Steger | A47F 5/101 |
| 11,203,872 B2 | 12/2021 | Hilgendorf et al. | |
| 11,478,079 B2 | 10/2022 | French et al. | |

* cited by examiner

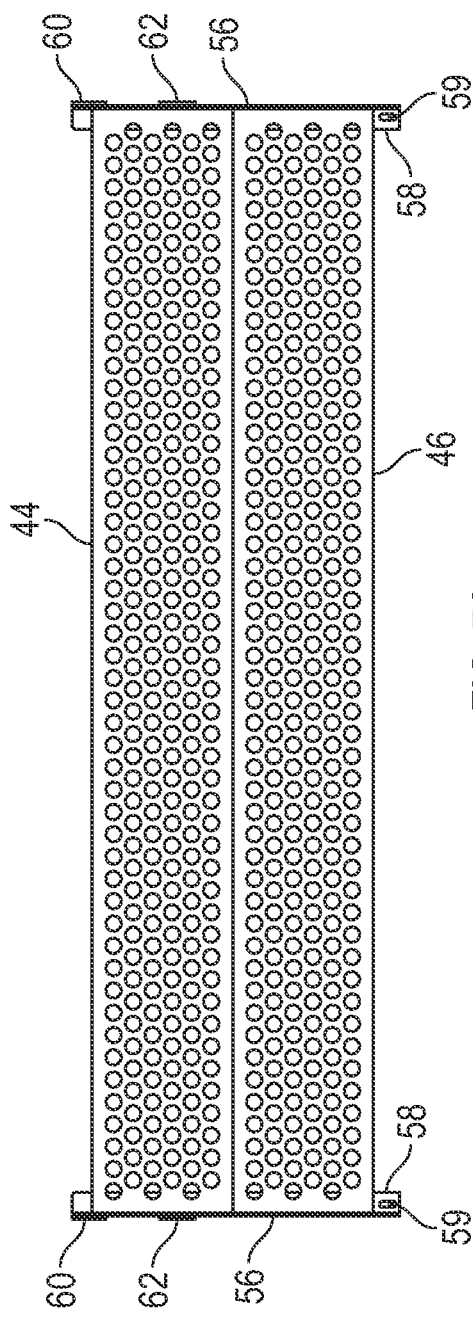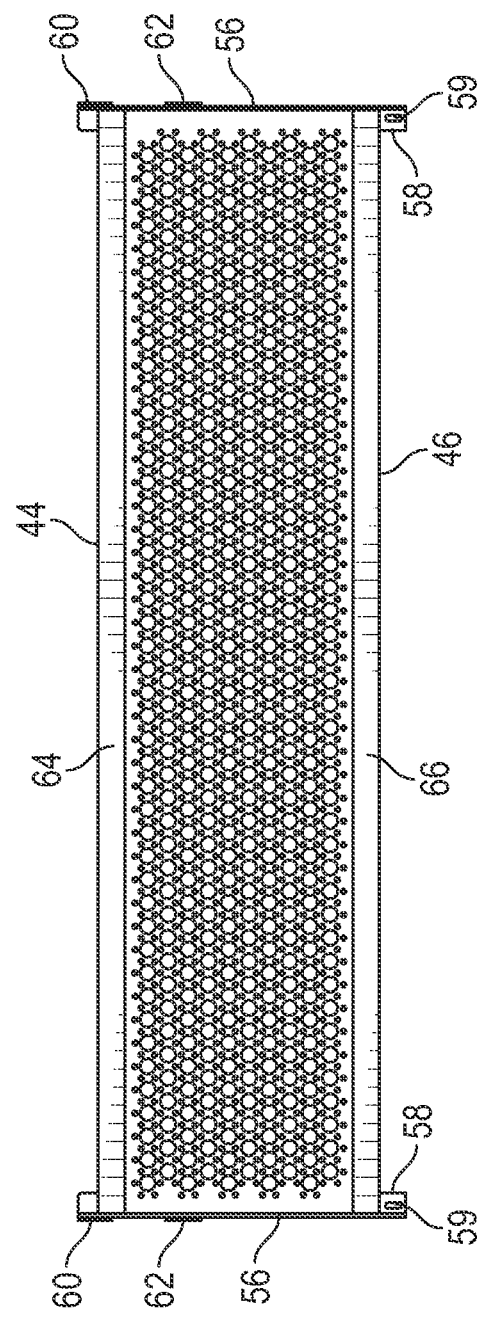

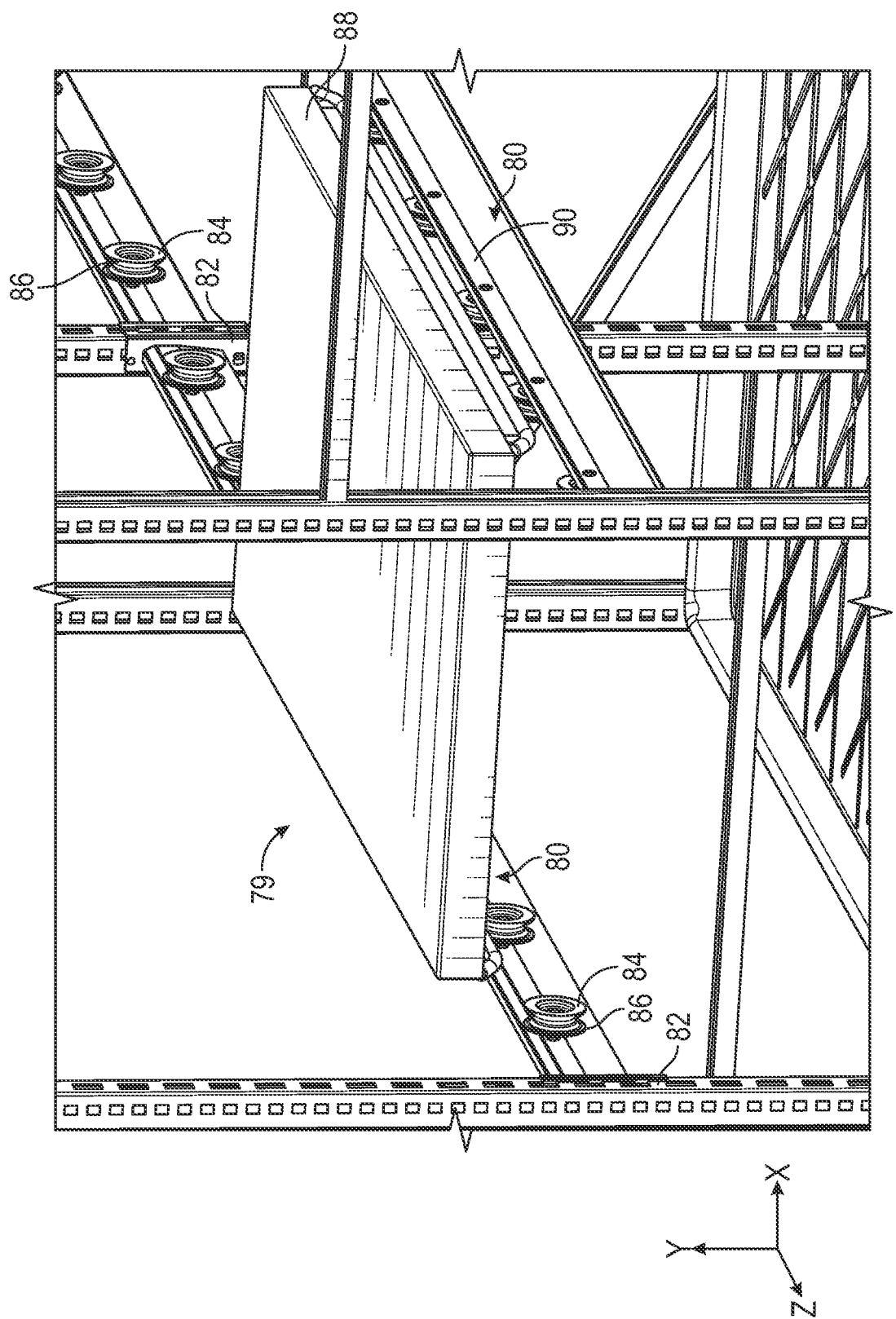

MOBILE STORAGE SYSTEM WITH ELEVATED PLATFORM

CROSS REFERENCE TO RELATED APPLICATIONS

This application is a continuation of U.S. patent application Ser. No. 17/096,044, filed Nov. 12, 2020, which claims the priority benefit of U.S. provisional application Ser. No. 62/934,742, filed Nov. 13, 2019, both of which are hereby incorporated herein by reference in their entireties.

FIELD OF THE INVENTION

The invention relates to a mobile storage system, and more particularly to a system of mobile storage units that are laterally movable along a floor or support surface.

BACKGROUND OF THE INVENTION

Moveable storage units are used in a wide variety of applications to increase storage density, or when storage space available in a given area is limited. Such systems are typically found in libraries, warehouses, hospitals, or other businesses that need to stack large amount of inventory or various other items, like products, files, books, or other forms of documents, that need to be stored on shelving units and yet easily accessed periodically. These systems typically include a number of moveable storage units, either on wheels or tracks, to form rows of shelf space and to allow at least some units to be moved to gain access to an adjacent row of shelf space. In particularly limited spaces, these storage units are known to extend relatively high from the ground, in which case a moveable ladder is used to reach shelf space that is otherwise unreachable.

SUMMARY OF THE INVENTION

The present invention provides a longitudinally extended and laterally movable storage assembly having rows of storage units that are movable towards each other to form a collapsed or compact storage assembly, and can be moved apart to form individual rows of the storage units that may be interconnected or interlocked by an elevated platform therebetween for easy access to shelf space of the storage units.

According to one form of the present invention, a storage rack system includes a pair of upright frame pieces and a lateral rail made up of an elongate plate extending between opposite ends designed to engage the uprights without being inadvertently dislodged from the uprights. The uprights are horizontally spaced apart from one another, with the lateral rail holding them together. Each upright defines a plurality of openings along its length, to permit the lateral rail to be positioned at different heights long the uprights. Each end of the lateral rail includes a T-shaped upper tab and a lower tab, both extending rearwardly from the elongate plate. The upper tab has an upper end portion extending upwardly and a downward end portion extending downwardly away from the upper end portion. The lower tab is spaced below the upper tab and has a downward end portion extending downwardly. The upper and lower tabs at each end portion are simultaneously insertable into respective upper and lower openings along the uprights, and are then lowerable so that the downward end portions of the upper and lower tabs secure the lateral rail to the uprights. The upper end portions of the upper tabs engage the uprights above the upper openings upon upward movement of the lateral rail, to prevent removal of the upper tabs from the upper openings.

In one aspect, a second pair of uprights is spaced apart from the first uprights to define a walking space, with a second lateral rail secured to the second pair of uprights. A platform has a planar walking surface and a pair of supports at opposite sides of the planar walking surface. The platform is positionable with the supports engaging the lateral rails so that the platform spans across the walking space.

In another aspect, the platform obstructs movement of the lateral rails toward one another upon upward movement of the lateral rails and disengagement of the downward end portions of the lower tabs from the uprights at the lower openings.

In yet another aspect, the lateral rails each define an elongate guide channel for receiving one of the platform's supports. Optionally, the lateral rail's elongate plate is oriented vertically and the guide channel extends horizontally from a lower end portion of the elongate plate. The guide channel includes an upwardly-facing open region for receiving the platform's support, which extends downwardly from the walking surface.

In a further aspect, the platform obstructs movement of the lateral rails toward one another upon upward movement of the lateral rails and disengagement of the downward end portions of the lower tabs from the uprights at the lower openings. Optionally, the upper end portions of the upper tabs are tapered in the upward direction so that the upper end portions of the upper tabs do not engage the uprights when the lateral rails are lowered with the downward end portions of the upper and lower tabs securing the lateral rails to the uprights. In this manner, the lateral rails are removable from the uprights only after disengagement of the platform from the lateral rails.

Thus, the present invention provides a modular storage assembly fitted with an adjustable-height platform that is supported by horizontal rails of spaced-apart carriages or racks, and that prevents accidental disengagement of the rails in the event that the rails are lifted in a manner that partially disengages them from the uprights that support them. The platform creates a catwalk between pairs of carriages or racks, thus interlocking the separate rows of the storage assembly and providing an elevated surface to reach shelf space of the storage assembly that is well above the ground.

These and other objects, advantages, purposes and features of the present invention will become apparent upon review of the following specification in conjunction with the drawings.

BRIEF DESCRIPTION OF THE DRAWINGS

FIGS. 7A and 7B are top plan views of alternative platform sections of the elevated platforms of the storage assembly of FIG. 1;

FIGS. 12A and 12B are top and bottom perspective views of one of the mobile elevated platforms of FIGS. 9 and 10;

DETAILED DESCRIPTION OF PREFERRED EMBODIMENTS

A storage assembly includes parallel and laterally movable rows of longitudinally extended modular storage units for storing goods, documents, plants, or the like. Each row of the storage assembly is independently movable in either lateral direction so that adjacent rows of the storage assembly can be separated to gain access to shelf space from between the adjacent rows. The separated adjacent rows can be interlocked by a platform to restrict movement of the rows relative one another and to create an elevated catwalk for easy access to elevated storage space of the storage units. The separated adjacent rows can later be disconnected by removing or repositioning the platform interconnecting the rows together such that the rows can be separated further apart or moved next to each other. The removed or repositioned platform is safely and conveniently stored at one of the storage assemblies so that it is stored unobtrusively, but can be deployed for use again as desired. In addition, the modular structure of the storage units allows for longitudinal shortening or extension of each row of the storage units.

Figure 1:
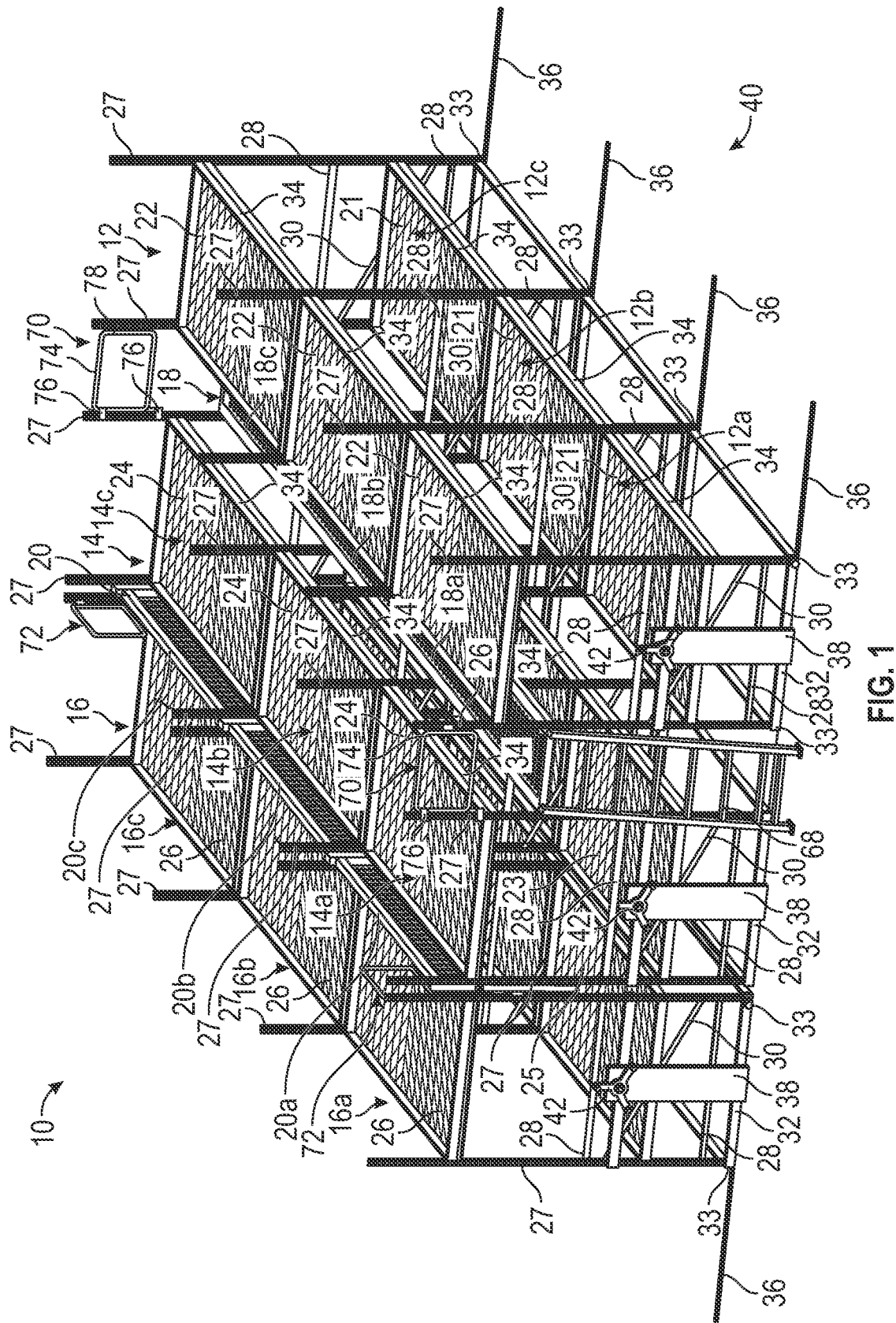
FIG. 1 is a perspective view of a storage assembly in accordance with the present invention, shown with a middle row of the storage assembly interconnected with an adjacent row of the storage assembly by a an elevated platform in a deployed configuration.

Referring now to the drawings and the illustrative embodiments depicted therein, a storage assembly 10, as shown in FIG. 1, includes a longitudinally extended, modular and mobile first outer row of storage units 12 (hereinafter referred to as a "first outer row 12"), a longitudinally extended, modular and mobile middle row of storage units 14 (hereinafter referred to as a "middle row 14"), and a longitudinally extended, modular and mobile second outer row of storage units 16 (hereinafter referred to as a "second outer row 16"). The first and second outer rows 12 and 16 are on opposite sides of the middle row 14, with the middle row 14 extending between the first and second outer rows 12 and 16. The storage assembly further includes a first deployable and adjustable platform 18 (hereinafter referred to as a "first platform 18") extending between the middle row 14 and the first outer row 12, and a second deployable and adjustable platform 20 (hereinafter referred to as a "second platform 20") extending between the middle row 14 and the second outer row 16.

Figure 2:
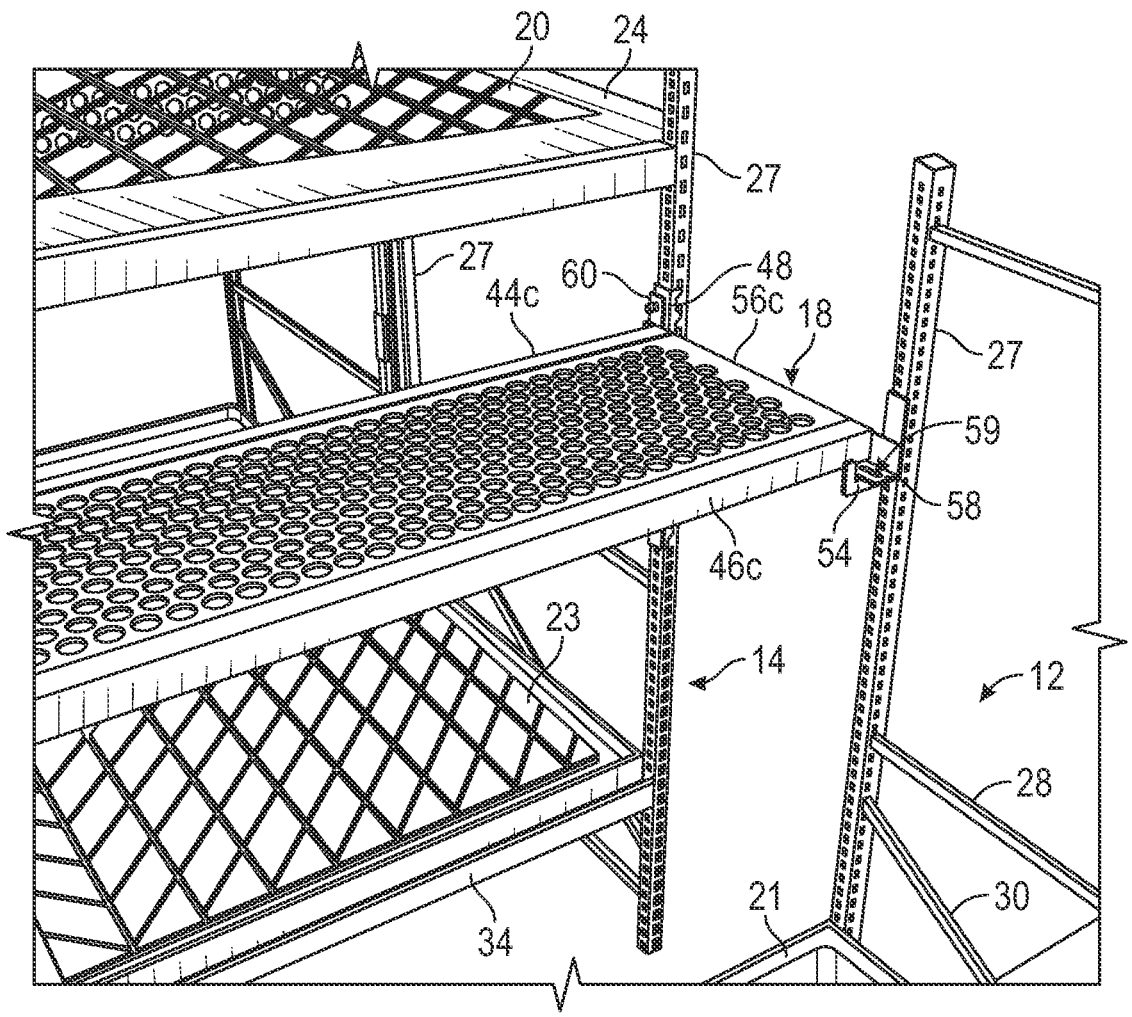
FIG. 2 is a perspective view of an interconnected portion of the storage assembly of FIG. 1.
Figure 3:
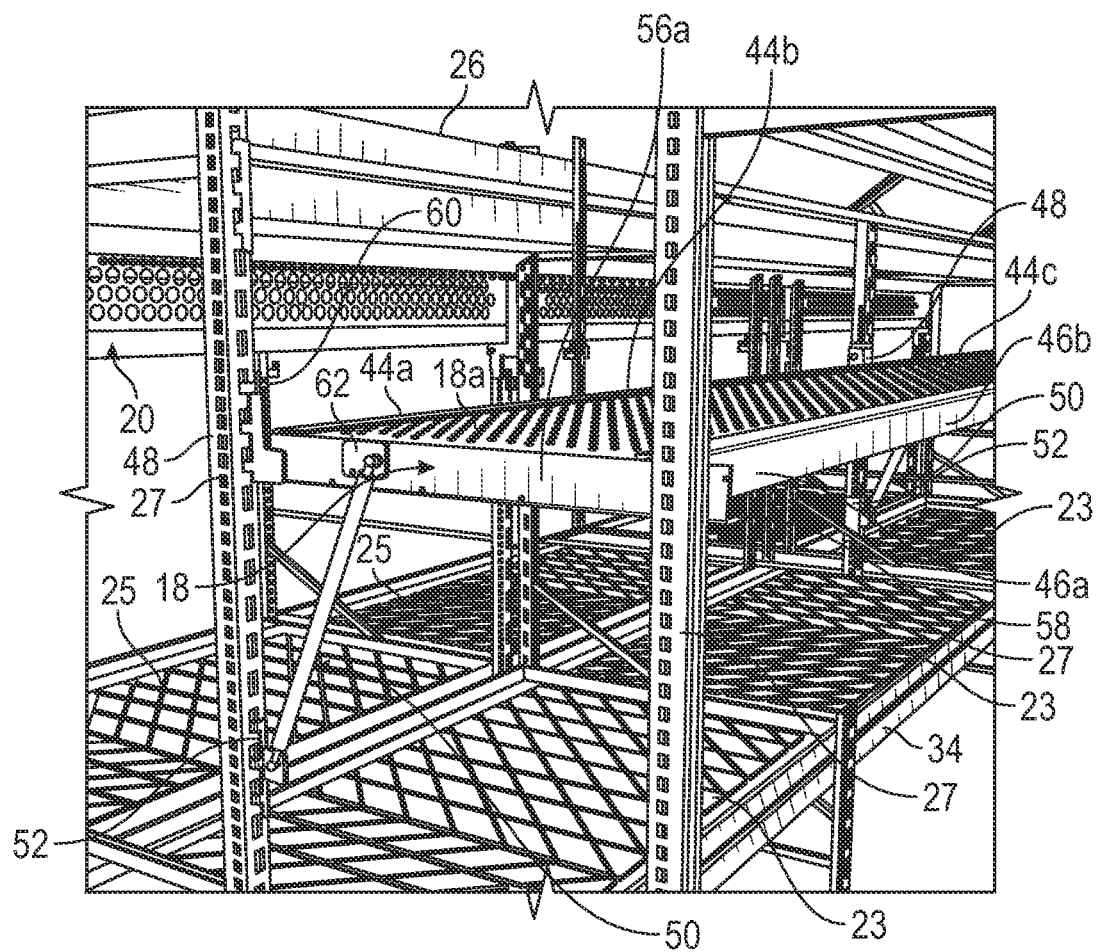
FIG. 3 is a perspective view of another interconnected portion of the storage assembly of FIG. 1.
Figure 4:
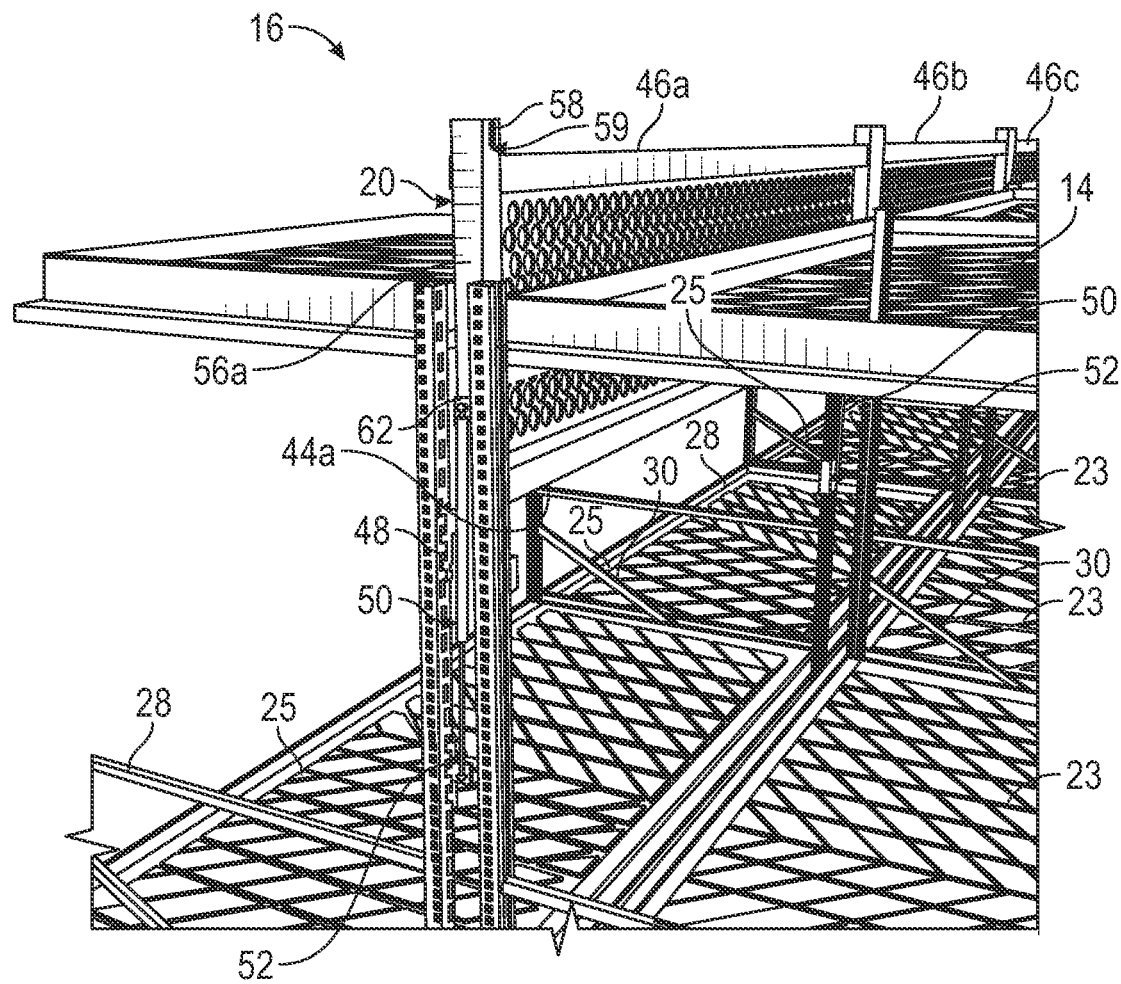
FIG. 4 is a perspective view of an unconnected portion of the storage assembly of FIG. 1, shown with an elevated platform in a stowed configuration.
Figure 5:
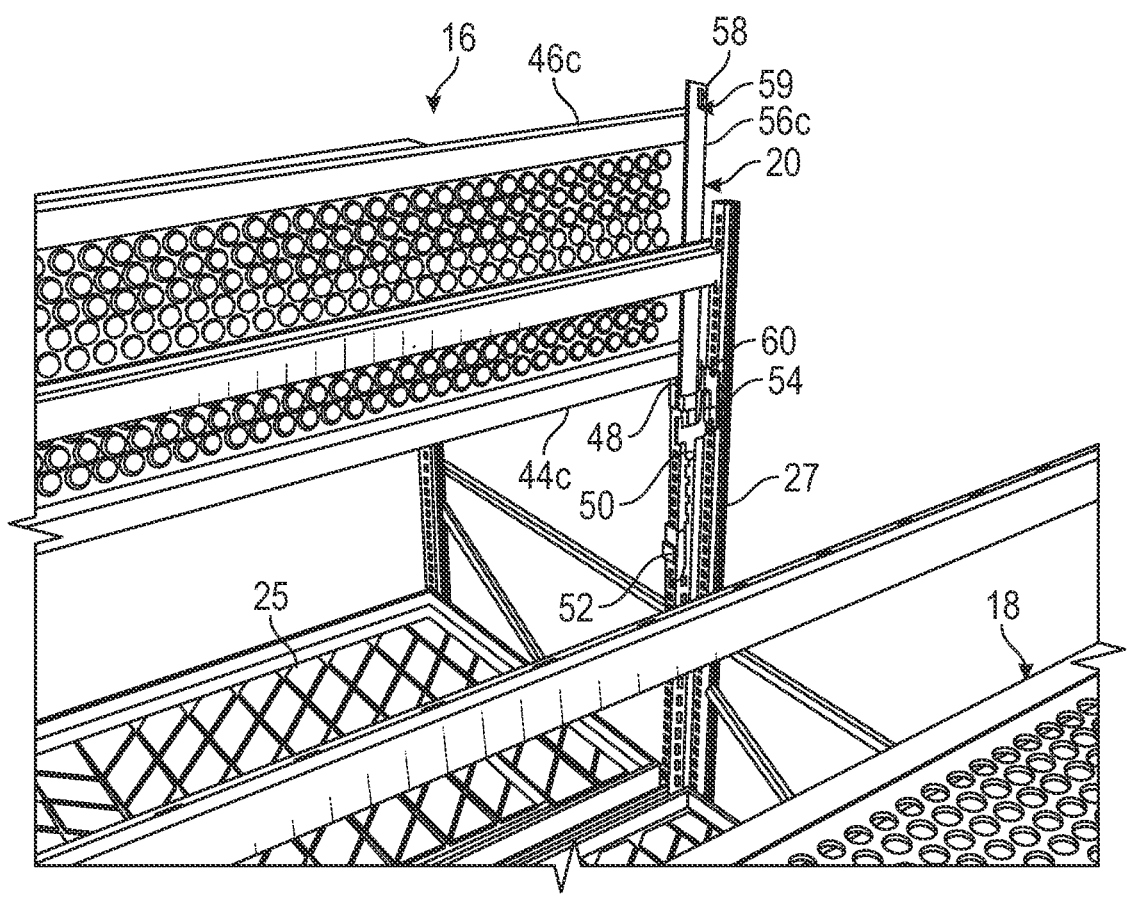
FIG. 5 is a perspective view of another unconnected portion of the storage assembly of FIG. 1, shown with the elevated platform in the stowed configuration.

The first, middle, and second rows 12, 14, and 16 are oriented generally parallel to one another, with each row 12, 14, and 16 being laterally movable along a floor or support surface 40 towards or away from a respective adjacent row to create or eliminate space/access therebetween. Both the first and second platforms 18 and 20 can be raised to a stowed configuration, such as shown in FIGS. 4 and 5, or can be lowered to a deployed configuration when sufficient space exists between the rows served by that platform, such as shown in FIGS. 2 and 3. In the illustrated embodiment of FIG. 1, the second platform 20 is in the stowed configuration between the middle and second rows 14 and 16, while the first platform 18 is in the deployed configuration between the middle row 14 and first row 12. With the second platform 20 being in the stowed configuration, the middle and second rows 14 and 16 are free to move independently of one another, including to a closely-abutting arrangement in which little or no gap exists between them. However, with the first platform 18 being in the deployed configuration, the middle and first rows 14 and 12 are not free to move independently of one another as they are interlocked with a fixed spacing set between them by the first platform 18.

The first platform 18 in the deployed configuration can be used as an elevated catwalk or walking space between the first and middle rows 12 and 14 such that a user positioned on the first platform 18 can readily access items positioned on elevated shelving surfaces 22 and 24 of the first and middle rows 12 and 14, or the user can tend to plants located on the elevated shelving surfaces 22 and 24. Once the first platform 18 is no longer needed to provide the elevated walking space between the first and middle rows 12 and 14, the first platform 18 can be raised to the stowed configuration and the first and middle rows 12 and 14 can again be moved apart or together, such as to a compact arrangement with little or no space between them. This arrangement allows for high density storage or planting in a storage or plant cultivation area with many storage units typically arranged in a close side-by-side configuration, while permitting spaces to be opened up between adjacent rows of storage units as desired, and access to upper levels of the storage units provided via the platforms 18 and 20, when they are deployed.

Each row 12, 14, and 16 includes a plurality of interconnected modular storage units or storage modules. In the illustrated embodiment of FIG. 1, the first outer row 12 includes three interconnected storage modules 12*a-c*, the middle row 14 includes three interconnected storage modules 14*a-c*, and the second outer row 16 includes three interconnected storage modules 16*a-c*. Each storage module 12*a-c*, 14*a-c*, and 16*a-c* includes a plurality of vertically extending frame members 27 that form a pair of opposing, longitudinally spaced, generally parallel, laterally extending upright frames. Each upright frame is formed by a pair of the frame members 27 connected by a plurality of laterally extended horizontal bars 28, a structural rod 30 diagonally extending between the horizontal bars 28, and a support assembly 32 laterally extending at the base of the upright frame. The plurality of horizontal bars 28, structural rod 30, and support assembly 32 provide for additional structural support and stability of each individual storage module and the entire row of modular storage units 12, 14 and 16.

Referring again to FIG. 1, each storage module 12*a-c*, 14*a-c*, and 16*a-c* includes at least one pair of opposing and removable connector beams 34 longitudinally extending between each respective upright frame of each storage module. In the illustrated embodiment of FIG. 1, each storage module 12*a-c*, 14*a-c*, and 16*a-c* includes at least two parallel pairs of opposing and removable connector beams 34 that are used to support two parallel shelving surfaces one above another, and to interconnect storage modules to form a row. For example, each storage module 12*a-c* includes two parallel pairs of opposing and removable connector beams 34, with each pair disposed one above another and used to support two parallel shelving surfaces 21 and 22. Likewise, storage modules 14*a-c* and 16*a-c* each include two parallel pairs of opposing and removable connector beams 34, with each pair disposed one above another and used to support two respective parallel shelving surfaces 23, 24 and 25, 26.

As best seen in FIGS. 2-5, each frame member 27 has a generally square cross section and defines a plurality of recesses, holes, teardrops, or catches around its periphery and extending along the height of each frame member 27. The recesses vertically extend in spaced arrangement along each frame member 27 to allow fastening mechanisms, such as hooks or latches, disposed at each end of each connector beam 34 to relatively tightly, securely and removably latch on or fasten to any one of the frame member 27. As such, it should be understood that each connector beam 34 is vertically repositionable along any one of the frame member 27, and that a shelving surface supported by a pair of removable opposing connector beams 34 is vertically adjustable along the height of storage modules 12*a-c*, 14*a-c*, and 16*a-c*. The frame members 27 and connector beams 34 are envisioned to be made of steel, although it will be appreciated that other rigid materials can also be used, if desired.

Returning now to FIG. 1, each row 12, 14, 16 of the storage assembly 10 is adapted to move along a plurality of laterally oriented, parallel and elongated drive tracks 36, which are fixedly secured to the floor or other support surface 40. Each track 36 is made from a continuous length of steel or aluminum, although it will be appreciated that other materials, such as plastic, could be used for the tracks 36. Each support assembly 32 of each upright frame of each row 12, 14, 16 includes at least a pair of wheels 33 that engage and roll along one of the tracks 36. Thus, each set of laterally parallel and co-planar upright frames of storage modules 12*a-c*, 14*a-c*, and 16*a-c* shares the same line of tracks 36. The plurality of tracks 36 enable the rows of modular storage units 12, 14 and 16 to be laterally moved freely towards or away from one another along the tracks 36 as needed to selectively create or eliminate access to a space or area between the rows of modular mobile storage units 12, 14, or 16. It should also be appreciated that tracks 36 are optional, such that movement of the rows 12, 14, and 16 can be accomplished with floor-engaging wheels or casters coupled to the support assemblies 32. Alternatively still, movement of the rows 12, 14, and/or 16 can be accommodated by a single guide track, such as in the manner described in commonly-owned U.S. provisional application, Ser. No. 63/088,537, filed Oct. 7, 2020 and entitled "SINGLE TRACK MOBILE CARRIAGE SYSTEM," which corresponds to U.S. Pat. Publication No. 2022/0106118, published Apr. 7, 2022, and which is hereby incorporated herein by reference in its entirety.

Each row of modular storage units 12, 14, and 16 includes a user-operated manual drive system 38, such as shown in FIG. 1. Each drive system 38 enables the user to easily move its associated row of modular storage units 12, 14 or 16 along the tracks 36 by providing a mechanical advantage through a suitable drive train. Such systems are available, for example, from Pipp Mobile Storage Systems, Inc. of Walker, Mich. Each manual drive system 38 includes a handle assembly 42, which the user can turn to impart linear movement to its associated row 12, 14 or 16 via the drive train. In the illustrated embodiment, one drive system 38 is secured to each frontal upright frame of the rows 12, 14 and 16. It should also be appreciated that each mechanically-driven manual drive system 38 may be replaced with a power-driven drive system having appropriate controls thereupon to control lateral movement of the rows 12, 14 and 16 with respect to one another.

With continued reference to FIG. 1, the first platform 18 of the storage assembly 10 is disposed between and longitudinally extends along inner sides of the first outer row 12 and the middle row 14. The second platform 20 of the storage assembly 10 is disposed between and longitudinally extends along inner sides of the middle row 14 and the second outer row 16. In the illustrated embodiment of FIG. 1, both first and second platforms 18 and 20 are sectional and include separate platform sections. For example, the first platform 18 includes sections 18*a*, 18*b* and 18*c*, each of which is disposed between and corresponds to a respective pair of laterally parallel storage modules 12*a* and 14*a*, 12*b* and 14*b*, and 12*c* and 14*c*. Likewise, second platform 20 includes sections 20*a*, 20*b* and 20*c*, each of which is disposed between and corresponds to a respective pair of laterally parallel storage modules 14*a* and 16*a*, 14*b* and 16*b*, and 14*c* and 16*c*. Both first and second platforms 18 and 20 are contemplated to be structurally, dimensionally, and functionally identical to one another, and thus will both be described in detail by reference to only one of the two platforms, where possible.

Figure 8A:
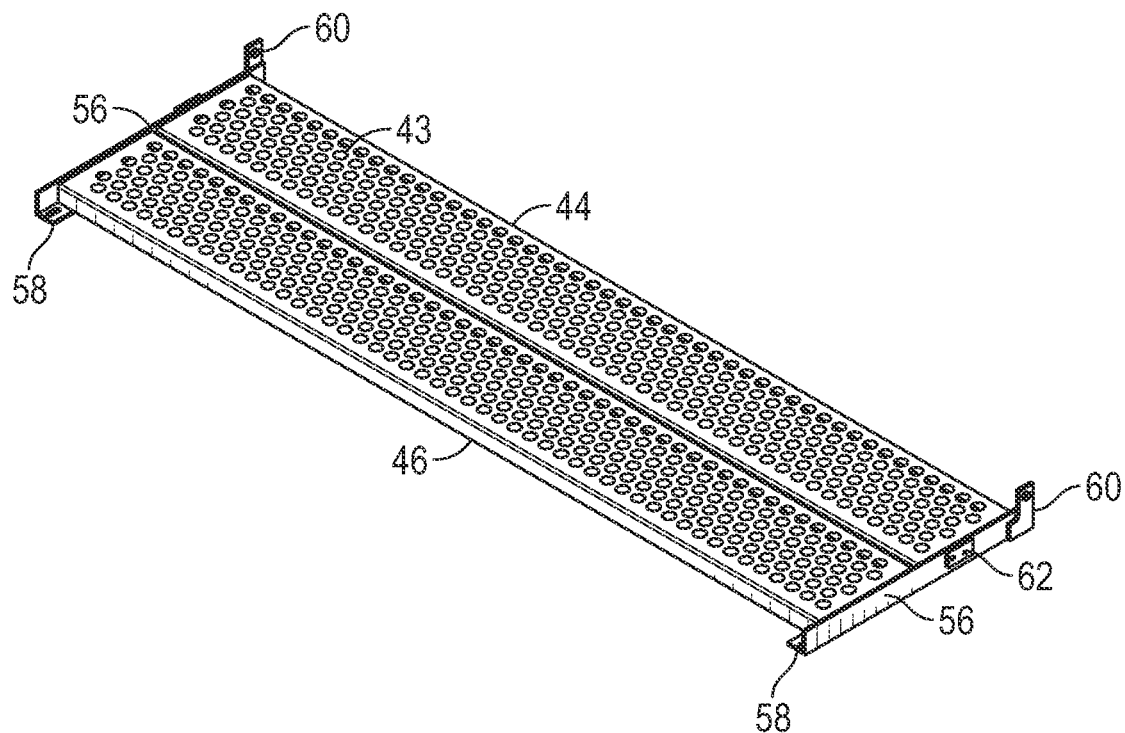
FIGS. 8A and 8B are perspective views of the alternative platform sections of respective FIGS. 7A and 7B.
Figure 8B:
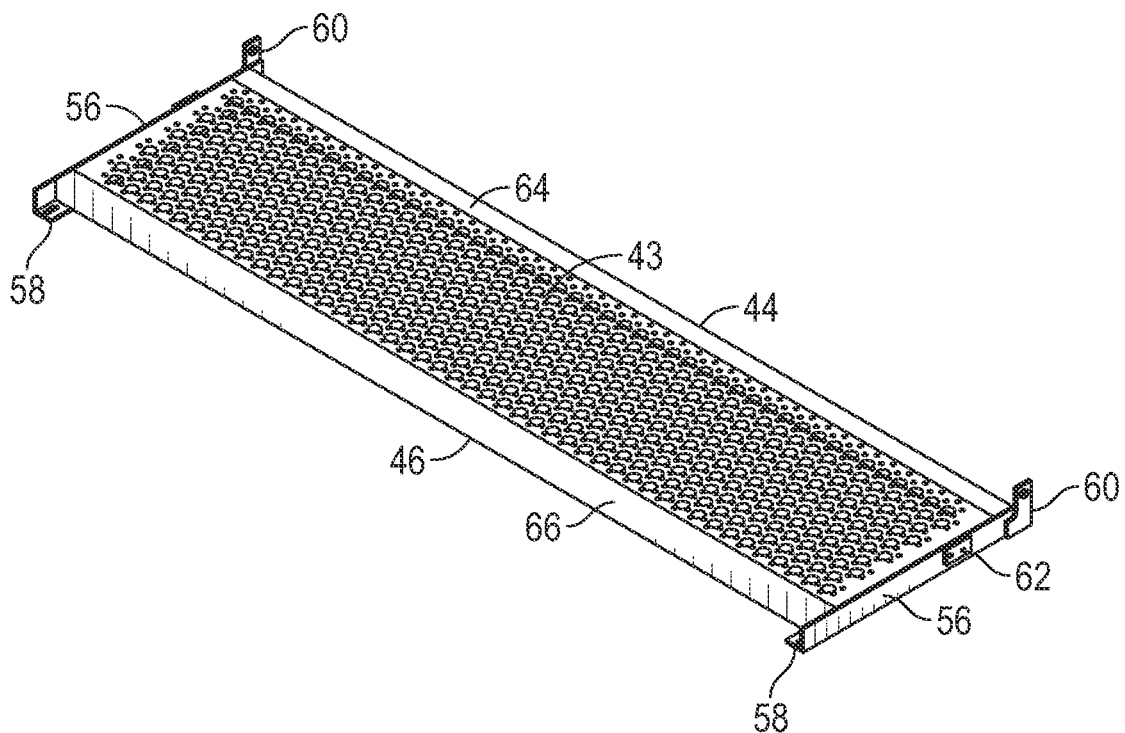

With reference to FIGS. 7A, 7B, 8A and 8B, each platform section 18*a-c* includes an upper side 43, a pair of opposing, parallel, and longitudinally extended sides (a proximal side 44 and a distal side 46), and a pair of opposing, parallel, and laterally extended ends 56. Each platform section 18*a-c* additionally includes a pair of latch members 58 disposed at opposing ends of the distal side 46 and transversely extending relative to the distal side 46. Each latch member 58 defines an opening 59 that can be used to secure the distal side 46 of each platform section 18*a-c*, when in the deployed configuration, to an adjacent row of modular storage units. Each section 18*a-c* also includes a pair of hinge members 60 disposed at opposing ends of the proximal side 44 and upwardly extending from the upper side 43 of each respective section 18*a-c*. Each section 18*a-c* of platform 18 further includes a mounting plate 62 disposed at each end 56. It is contemplated that the upper side 43 of each section 18*a-c* includes a perforated surface, such as shown in FIGS. 7A and 8A, or a grating surface, such as shown in FIGS. 7B and 8B, and/or an anti-slip traction tread surface. It is further envisioned that each section 18*a-c* may include a first and second safety guards 64 and 66 extending along respective proximal side 44 and distal side 46, with both the first and second safety guards 64 and 66 upwardly extending from the upper side 43 of each respective section 18*a-c*, such as shown in FIGS. 7B and 8B.

Referring now to FIGS. 2 and 3, platform sections 18*a-c* of the first platform 18 include respective proximal sides 44*a-c*, respective distal sides 46*a-c*, and respective pair of opposing ends 56*a-c*. Each proximal side 44*a-c* is pivotably coupled to the inner side of the middle row 14 forming a longitudinal pivot axis for each platform section 18*a-c* at its respective proximal side 44*a-c*. The pivotable coupling is accomplished by pivotally securing the pair of hinge members 60 of each section 18*a-c* to respective pivot and locking brackets 48 that are removably connected to respective frame members 27 at the inner side of the middle row 14 (FIGS. 2-3). Further, a pair of self-extending gas spring cylinders 50 couple the pair of mounting plates 62 of each section 18*a-c* to a pair of respective support brackets 52 that are positioned below the pivot and locking brackets 48, and are removably connected to the respective frame members 27 at the inner side of the middle row 14.

For example, in the illustrated embodiments of FIGS. 2 and 3, upper ends of the self-extending gas spring cylinders 50 are pivotably connected to the pair of mounting plates 62 of platform section 18*a*. The self-extending gas spring cylinders 50 extend downwardly at an angle from the mounting plates 62 to the pair of support brackets 52, where lower ends of the pair of self-extending gas spring cylinders 50 are pivotably connected to the pair of support brackets 52. It will be appreciated that sections 18*a-c* may be pivotably coupled to the inner side of the first outer row 12 in the similar manner as they are coupled to the inner side of the middle row 14, in which case sections 18*a-c* may be pivoted to couple with the inner side of the middle row 14.

Also, it will be understood that platform sections 18*a-c* are independently vertically repositionable along the height of the respective frame members 27, such that the elevation of each individual platform section 18*a-c* is adjustable according to user's preference.

Similar to what is illustrated in FIGS. 4 and 5 for the second platform 20 with sections 20*a-c* attached to the inner side of the second outer row 16, first platform sections 18*a-c* attached to the inner side of the middle row 14 may be pivoted by at least about 90 degrees around their longitudinal pivot axis to be upwardly raised to the stowed configuration before moving the first and middle rows 12, 14 towards one another. In other words, once an interference in the form of the platform sections 18*a-c* is removed, the distance between the first and middle rows 12 and 14 can be eliminated. It will further be appreciated that the platform sections 18*a-c* may alternatively be downwardly pivoted to the stowed configuration. Also, the pivoting action of the platform sections 18*a-c* may be accomplished by means other than the self-extending gas spring cylinders 50. For example, the proximal sides 44*a-c* of the respective platform sections 18*a-c* may alternatively include pivotable hinges attached to respective frame members 27. It will also be understood that instead of the pivoting action of platform sections 18*a-c* described above, the platform sections 18*a-c* may be simply removed so that the rows 12 and 14 can be pushed towards one other.

As best shown in FIGS. 2 and 3, whenever access between the first and middle rows 12 and 14 is desired, and/or whenever access to shelf space that is well above the ground is desired, the rows 12 and 14 can be moved away from one another. Once appropriate distance between the first and middle rows 12 and 14 is created, each platform section 18*a-c* can individually be downwardly pivoted around its longitudinal pivot axis to the deployed configuration so that respective latch members 58 of the platform sections 18*a-c* rest atop respective hooks or cantilevers 54 that are removably attached to respective frame members 27 of the inner side of the first adjacent row 12. For example, once the platform sections 18*a-c* are lowered, openings 59 of respective latch members 58 may receive latching structures to securely interconnect the first and middle rows 12 and 14 by the platform sections 18*a-c*. The hook portions of the cantilevers 54 serve to limit or prevent swaying of one row relative to the other, and ensure that the latch members 58 are retained atop the cantilevers 54 in the event of relative movement of one row relative to the other in the longitudinal direction. It will thus be appreciated that the latch members 58 and cantilevers 54 are configured such that respective latch members 58 attach to, latch onto, hook onto, or are simply supported by respective cantilevers 54. In this arrangement, the rows of modular storage units 12 and 14 are interconnected by the platform 18 when deployed therebetween, which also provides an elevated surface or a catwalk for easy access to shelves 22 and 24 that are spaced well above the ground.

Figure 6C:
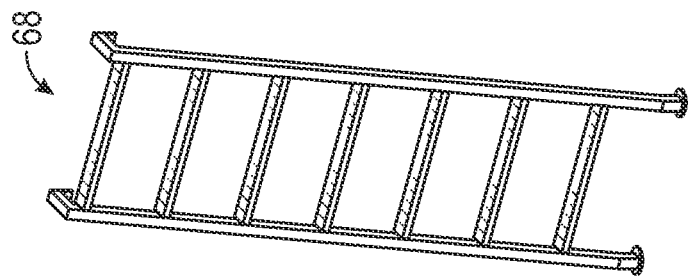
FIGS. 6A-C are perspective views of a plurality of ladders that can be used to access the elevated platforms of the storage assembly of FIG. 1.
Figure 6B:
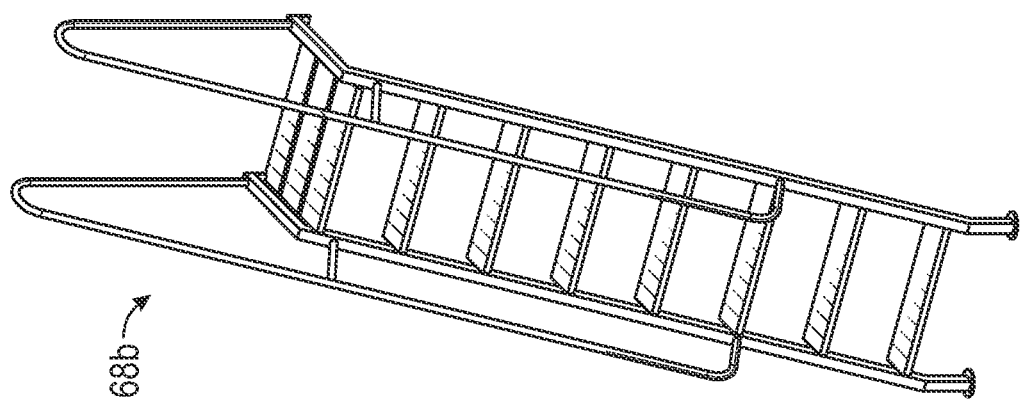
Figure 6A:
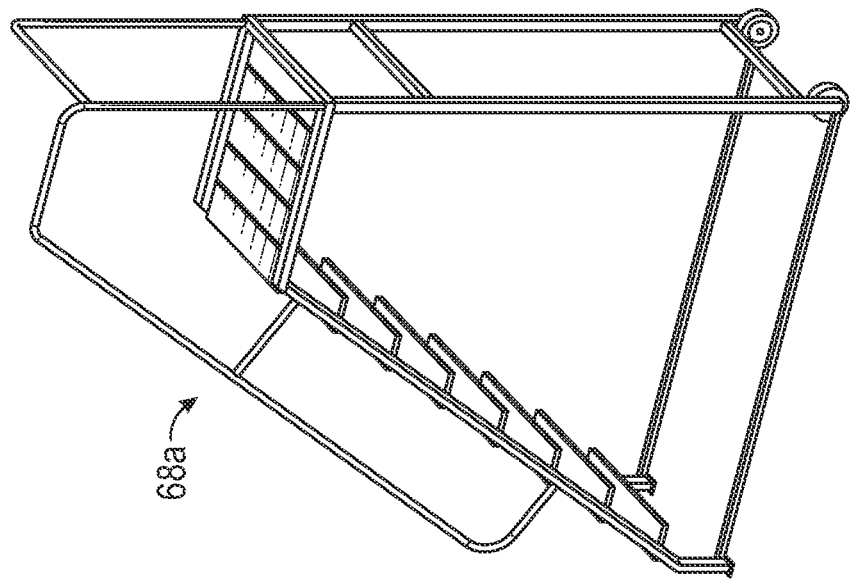

In the illustrated embodiment of FIG. 1, a ladder 68 is provided for access to the first platform 18 when it is in the deployed configuration. As shown, the ladder 68 extends at a slope from platform section 18*a* to the ground 40. The same or an additional ladder 68 can be provided for access to the second platform 20, when the second platform 20 is in the deployed configuration. Other ladder styles are envisioned, such as the freestanding ladder 68*a* of FIG. 6A and the ladder 68*b* having an upper platform and railings (FIG. 6B) that are adaptable for integration with the storage assembly 10. Suitable ladders may include hand rails, two or more wheels to facilitate rolling along the ground, a one-way safety gate, or a combination thereof. Ladder 68 may be removably attached to the storage assembly 10 and removed and stored when not in use. Optionally, ladder 68 may be pivotably secured, for example to the platform section 18a, such that ladder 68 may be deployed together with the platform section 18a and pivoted to slope to the ground 40 whenever platform section 18a is in the deployed position, and then upwardly or downwardly pivoted and stowed together with platform section 18a for storage whenever platform section 18a is upwardly or downwardly pivoted and stowed.

With reference to FIG. 1, storage assembly 10 further includes a first pair of one-way swing gates 70 and a second pair of one-way swing gates 72. The first swing gates 70 are disposed between first and middle rows 12 and 14 at the opposite ends of the first platform 18. As shown in FIG. 1, the first swing gates 70 are in a deployed position. The second swing gates 72 are disposed between middle and second rows 14 and 16 at the opposite ends of the second platform 20. As shown in FIG. 1, the second swing gates 72 are in a stowed position. Both first and second swing gates 70 and 72 are contemplated to be structurally, dimensionally and functionally identical to one another.

In the illustrated embodiment, the first swing gates 70 are pivotably attached to a frame member 27 at the inner side of the middle row 14, such that whenever the first platform 18 is raised to the stowed configuration the first swing gates 70 will be pivoted and maintained in the stowed position, such as shown for the second platform 20 and the second swing gates 72 in FIG. 1. Alternatively, whenever the first platform 18 is lowered to the deployed configuration, the first swing gates 70 will pivot and remain in the deployed position. Each of the first swing gates 70 includes a cross member 74, a gate hinge 76, and a closure mechanism such as a spring (not shown). The gate hinge 76 pivotably connects each swing gate to the respective frame member 27 at the inner side of the middle row 14. The closure mechanism biases each swing gate closed against a stop bracket 78 attached to an opposing frame member 27 at the inner side of the first row 12.

The gate hinge 76 allows the cross member 74 to swing at least 90 degrees around a vertical axis of the frame member 27 of the middle row 14 so that cross member 74 does not interfere with closing of the gap between the rows of modular storage units 12 and 14 when the rows 12 and 14 are moved towards one another. The stop bracket 78 may include a magnet, a latch, strap, or other retainer to ensure that cross member 74 is releasably connected to the stop bracket 78 whenever cross member 74 is swung to connect with the stop bracket 78. As a security measure, the stop bracket 78 is configured to prevent the cross member 74 from outwardly swinging or pivoting to reduce the likelihood that a user on the platform can inadvertently fall off an open end of the first platform 18. It should also be appreciated that each of the first swing gates 70 may be pivotably attached to an opposing frame member 27 at the inner side of the first row 12, particularly when sections 18a-c are pivotably coupled to the inner side of the first row 12 instead of the middle row 14.

With reference to FIGS. 9-12, a mobile platform 79 can be used as an elevated catwalk and to interconnect first outer row 12 with middle row 14 and/or to interconnect middle row 14 with second outer row 16. In the illustrated embodiment, the first row 12 and middle row 14 are interconnected by the mobile platform 79, which can roll between the rows while being supported by a pair of removable support beams 80. The first support beam 80 is removably secured to and longitudinally extends along the inner side of the first outer row 12, while the second support beam 80 is removably secured to and longitudinally extends along the inner side of the middle row 14. It will be understood that since the middle row 14 includes two opposing inner sides, unlike the first and second outer rows 12 and 16, the middle row 14 includes a pair of opposing removable support beams 80. Each support beam 80 is constructed of separate support beam sections 80a, 80b, and 80c, with each section 80a-c corresponding to a respective storage module 12a-c and 14a-c. For example, the inner side of the first outer row 12 includes support beam sections 80a-c that correspond to respective first storage modules 12a-c, and the inner side of the middle row 14 includes support beams 80a-c that correspond to respective middle storage modules 14a-c.

Each support beam section 80a-c longitudinally extends between respective upright frame members 27. Each support beam section 80a-c has a pair of opposing ends, each of which includes a latching bracket 82 with a fastening mechanism, such as a hook or a latch, which allows support beam sections 80a-c to removably attach to the respective upright frame members 27. It should thus be understood that each support beam section 80a-c is vertically repositionable along any one of the frame member 27, such that platform 79 supported by support beam 80 is vertically adjustable along the height of the frame members 27. Each support beam section 80a-c further includes a plurality of outwardly protruding and longitudinally spaced apart rotatable support wheels 84. The rotatable support wheels 84 protrude outwardly relative to the respective inner sides of the first and middle rows 12 and 14.

Figure 12B:
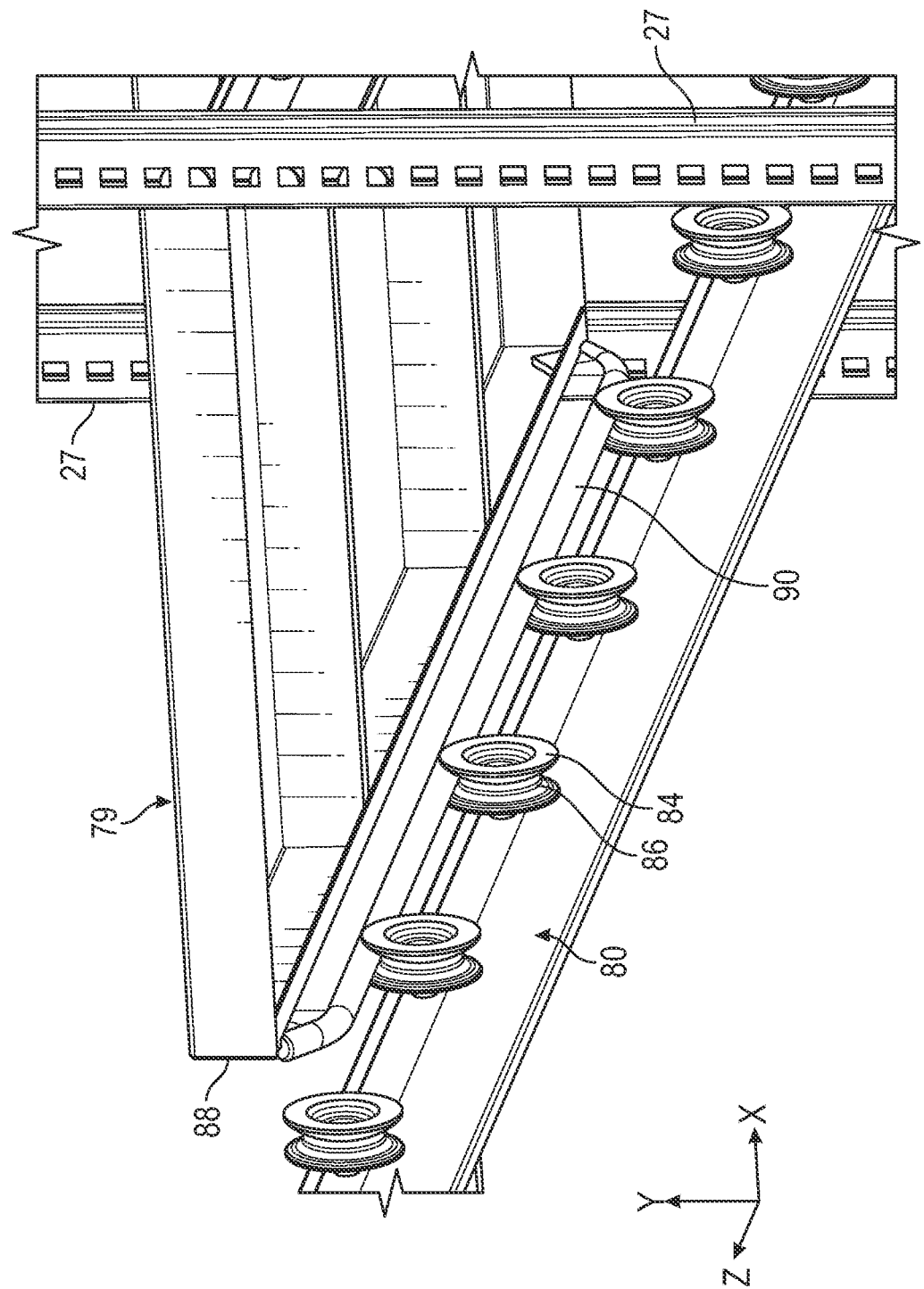

Each rotatable support wheel 84 includes a concave contact surface 86 as shown in FIGS. 12A and 12B. The mobile platform 79 includes a pair of parallel rail members 90, each extending at the bottom of the platform 79 and along a respective longitudinal side 88. Each rail member 90 is correspondingly shaped to engage the inwardly curved concave contact surface 86 of the rotatable support wheels 84, and allows the platform 79 to be lifted off of the support wheels 84 if desired. Each rail member 90 cooperates with the rotatable support wheels 84 so that the mobile platform 79 can roll along the support beams 80 that are disposed at the respective inner sides of the first and middle rows 12 and 14. It will thus be understood that whenever the rail members 90 of platform 79 engage the rotatable support wheels 84, the first and middle rows 12 and 14 are selectively interconnected with one another via the mobile platform 79, which may supplement other temporary or releasable mechanical connections established between the rows.

Figure 9:
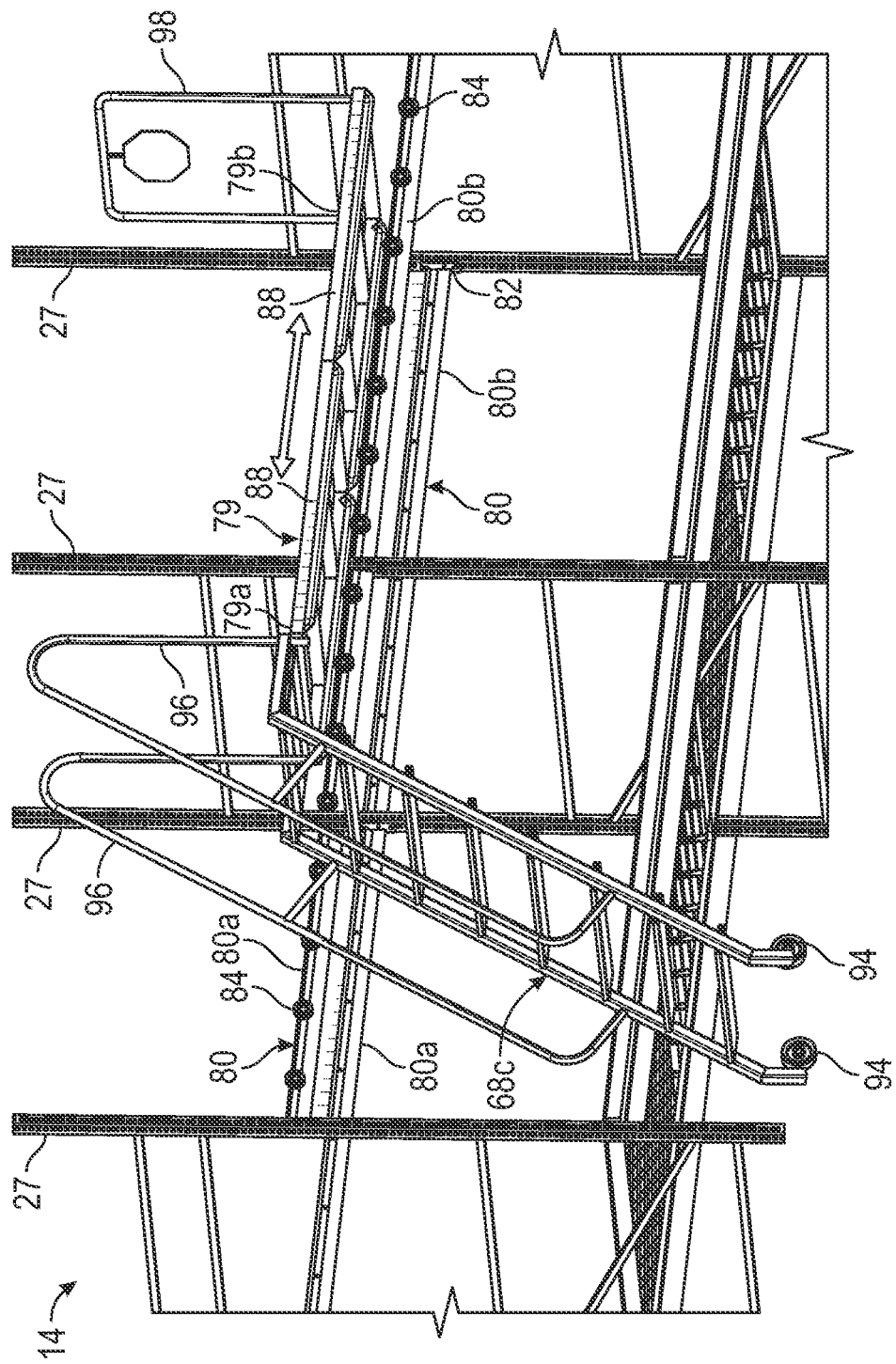
FIGS. 9 and 10 are perspective views of mobile elevated platforms that can be substituted for the elevated platforms of the storage assembly of FIG. 1.
Figure 10:
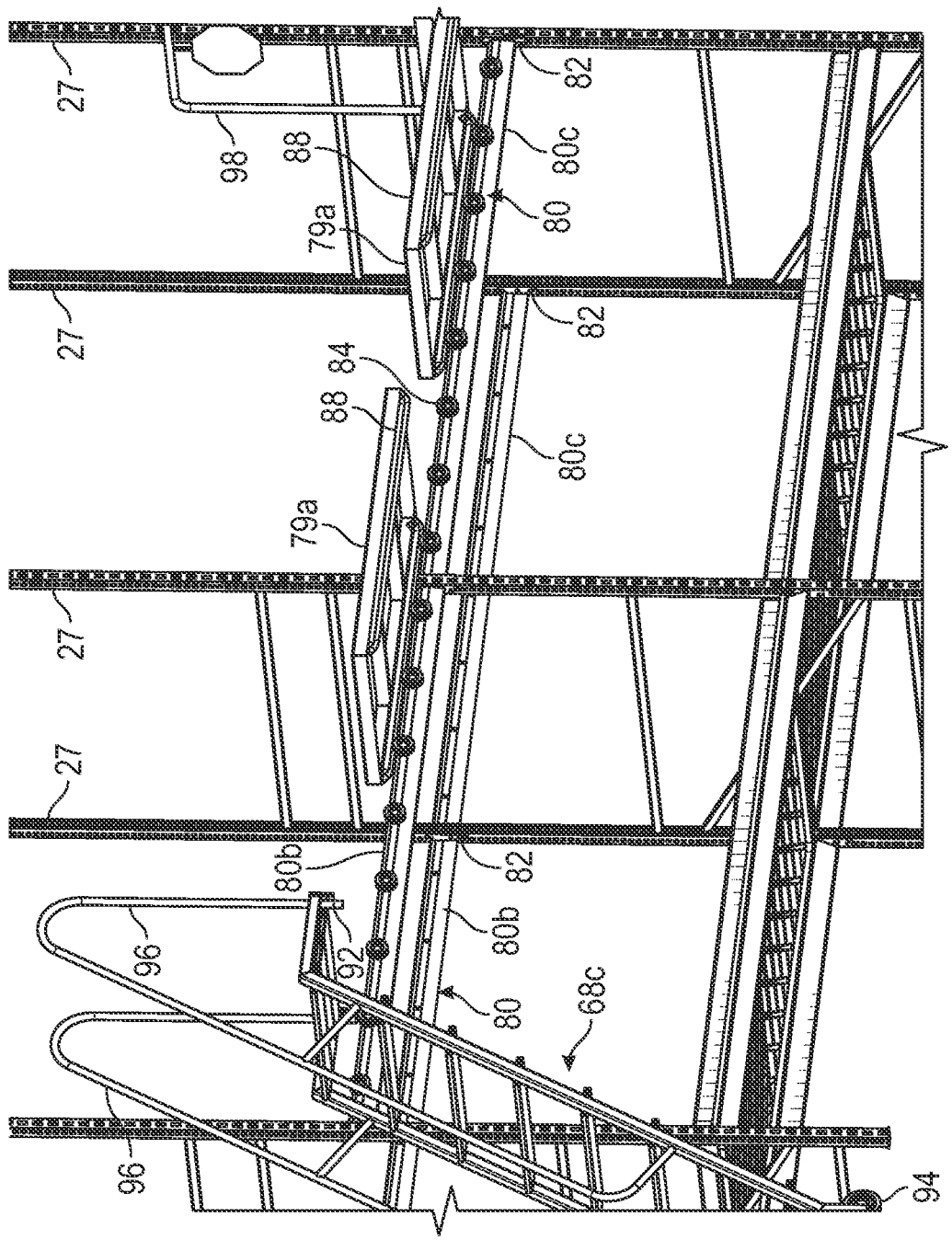

Similar to the first and second platforms 18 and 20 discussed above, the mobile platform 79 can be sectional. In the illustrated embodiments of FIGS. 9 and 10, platform 79 includes mobile platform sections 79a and 79b. It is envisioned that the platform sections 79a and 79b can be selectively intercoupled with one another by fasteners, such as clasps, hooks, or latches, such that the platform sections 79a and 79b can roll along the support beams 80 in the interlocked arrangement as shown in FIG. 9, or independently as shown in FIG. 10. It should be understood, however, that platform 79 may include three or more mobile sections, if desired. Optionally, as shown in FIGS. 9 and 10, for safety reasons at least one of the platform sections 79a or 79b may have a safety bar or railing 98 removably attached at an end of the platform section 79a or 79b. It should also be appreciated that mobile platform 79 is envisioned to be made of lightweight but rigid material, such as aluminum alloy or fiber-reinforced resinous plastic for example. It is further contemplated that the platform sections 79a and 79b may have pivoting arms (not shown) that can be used to hook and stow the platform sections 79a, 79b to the bottom of shelving surfaces 24 for example.

As shown in FIGS. 9 and 10, a ladder 68c may be attached to the mobile platform 79. It is envisioned that an upper end of the ladder 68c has a pair of pegs 92 to securely and removably connect the ladder 68c to any one of the platform sections 79a, 79b. A lower end of the ladder 68c is fitted with a set of wheels 94 to facilitate rolling of the ladder along the ground 40. It is further contemplated that the upper end of the ladder 68c may have a one-way safety gate (not shown) disposed between a pair of upright safety rails 96.

Figure 11:
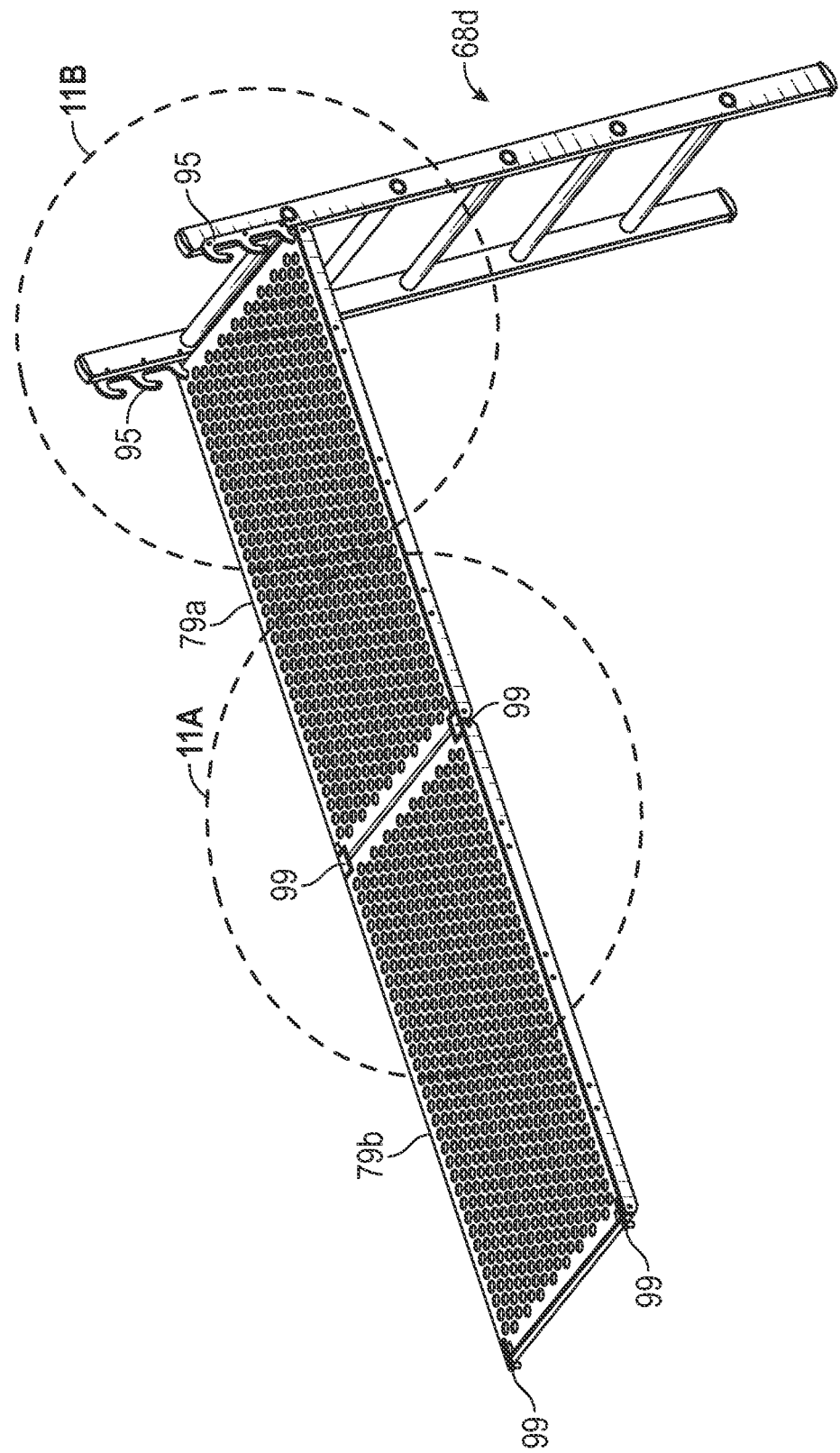
FIG. 11 is a perspective view of the mobile elevated platforms of FIGS. 9 and 10, shown connected with a ladder and interconnected with one another.
Figure 11A:
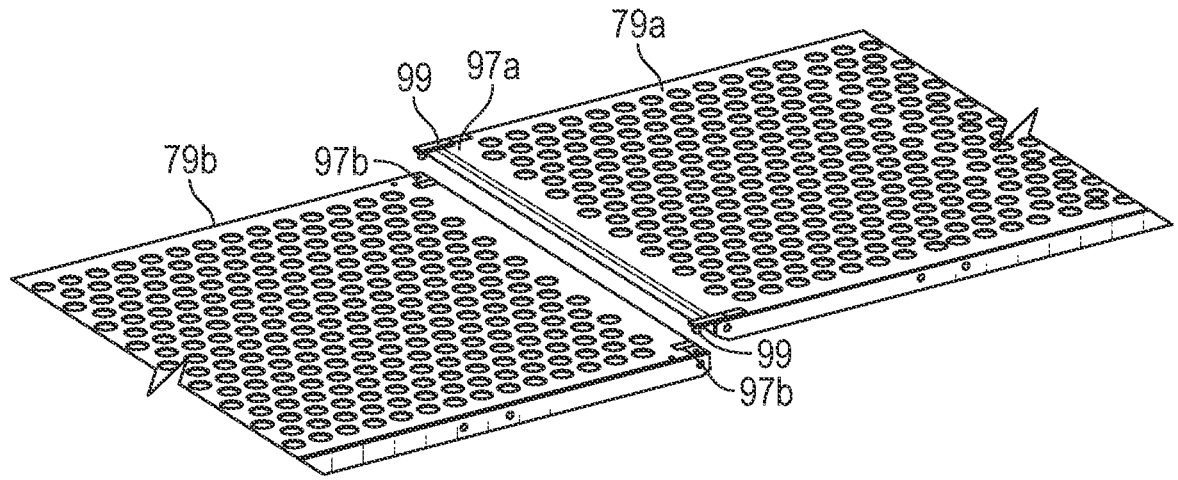
FIGS. 11A and 11B are enlarged views of the areas designated 11A and 11B in FIG. 11, with mobile platforms and the ladder shown just prior to engagement.
Figure 11B:
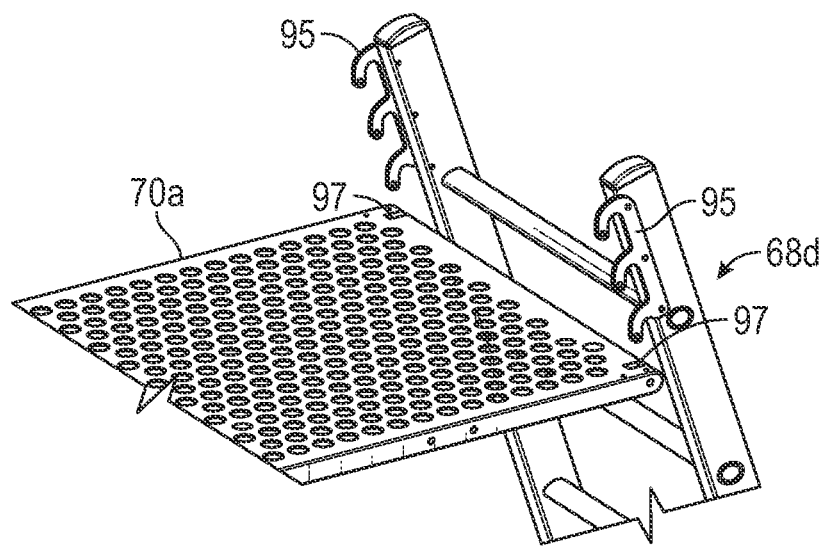

Optionally, another ladder 68d is fitted with a pair of triple-hook members 95, such as shown in FIGS. 11 and 11B. Each triple-hook member 95 includes three downwardly-curved hook portions for safe, secured, and repositionable engagement of the ladder 68d with any one of the platform sections 79a, 79b. The three hook portions allow the ladder to be set at a desired angle for a given user, and it will be appreciated that ladders having different lengths, different rung counts, and different numbers of hook portions may be used.

Each platform section 79a and 79b includes a first pair of connector slots 97a at one end and a second pair of connector slots 97b at the other end, which slots can be used for engagement of any pair of the hooks of the triple-hook members 95 with platform section 79a or 79b. Additionally, the connector slots 97a, 97b may be used to selectively interconnect platform sections 79a and 79b using a pair of deck brackets 99 adjacent the first connector slots 97a of the first platform section 79a, which deck brackets 99 have distal ends that are received in the second connector slots 97b of the adjacent second platform section, such as shown in FIG. 11A. In the illustrated embodiment, the deck brackets 99 are secured by fasteners to respective corners of the first platform section 79a, laterally outboard of the respective connector slots 97a. Once interconnected, the platform sections 79a, 79b can be pivotally disengaged by either downwardly tilting of the unconnected end of platform section 79a, or by lifting the first platform section 79a to disengage deck brackets 99 from the connector slots 97b of the second platform section 79b. It will be understood, however, that deck brackets 99 can be attached to either end of any platform section, for connection to an adjacent platform section, while leaving slots 97a open for optional connection of the ladder 68d.

Figure 13:
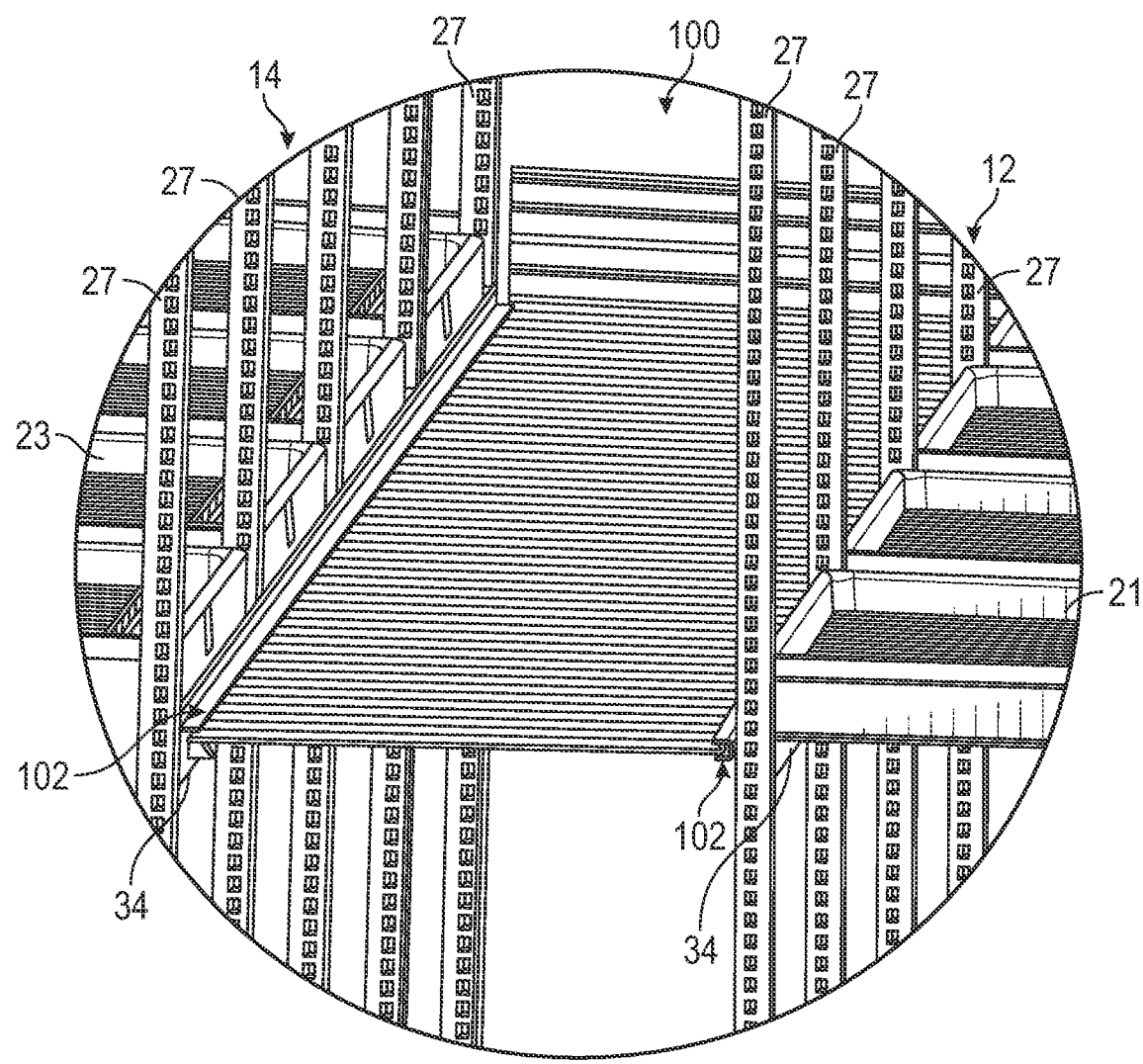
FIG. 13 is a perspective view of a tambour platform that can be substituted for the elevated platforms of the storage assembly of FIG. 1.
Figure 14:
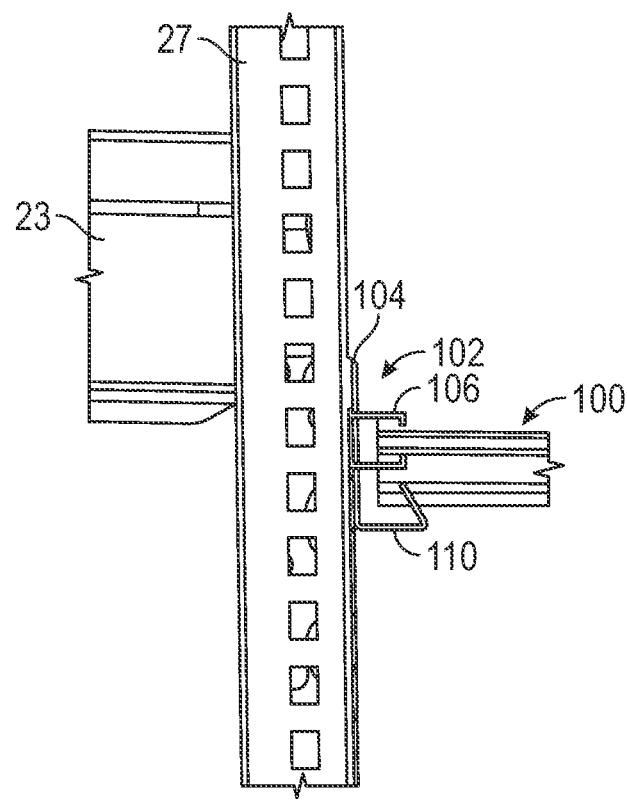
FIG. 14 is a side elevation view of one end of the tambour platform of FIG. 13.
Figure 15:
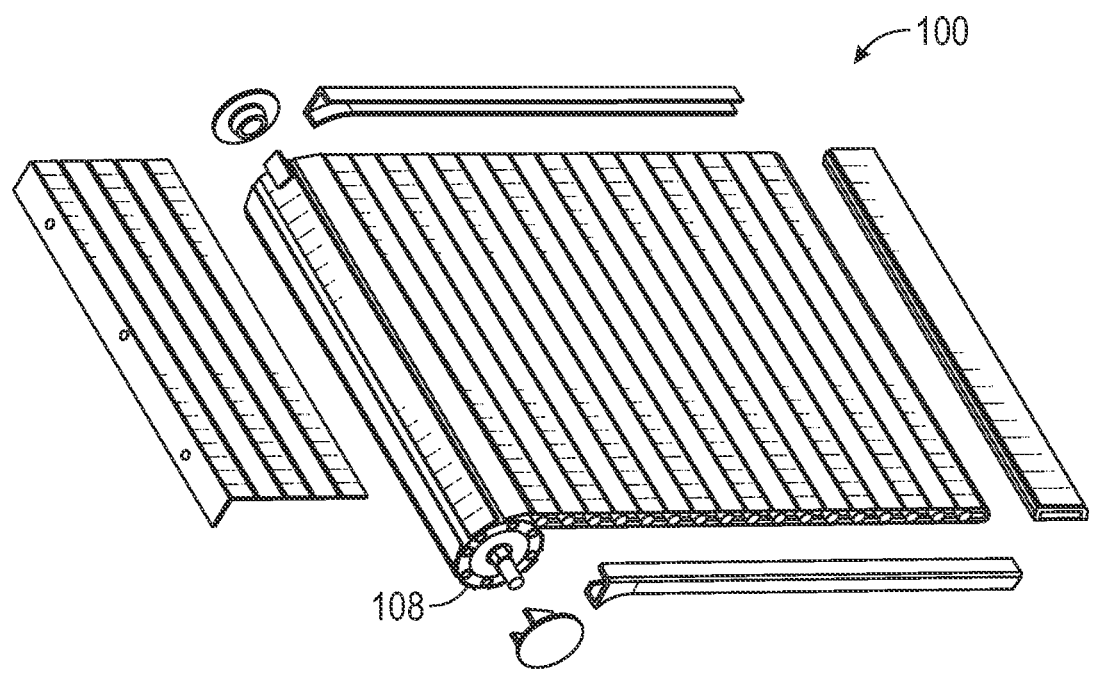
FIG. 15 is an exploded perspective view of the tambour platform of FIG. 13.
Figure 16:
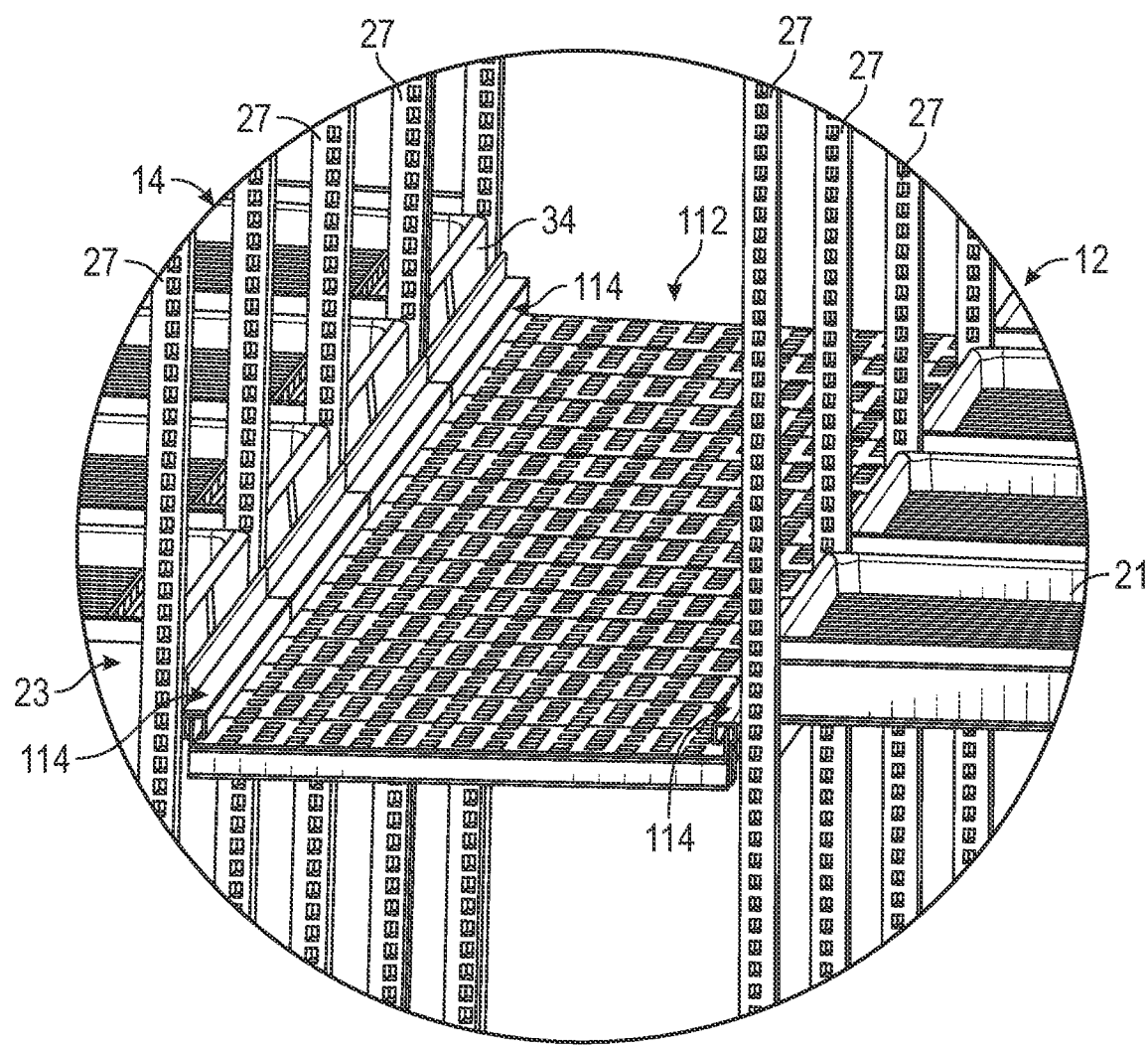
FIG. 16 is a perspective view of a sliding/rolling platform that can be substituted for the elevated platforms of the storage assembly of FIG. 1.

With reference to FIGS. 13-15, a tambour platform 100 can be used as an elevated catwalk and to interconnect first outer row 12 with middle row 14 and/or to interconnect middle row 14 with second outer row 16. In the illustrated embodiment of FIG. 13, the first and middle rows 12 and 14 are interconnected by the tambour platform 100, which is adapted to slide or roll along and between the first and middle rows 12 and 14 while being supported by a pair of guide rails 102. Each guide rail 102 is either permanently or removably attached to a respective connector beam 34. As discussed above, connector beams 34 are longitudinally disposed along the inner sides of respective rows 12 and 14, and are used to support shelving surfaces 21 and 23 of the respective first and middle rows 12 and 14. As described above with reference to FIG. 1, each connector beam 34 is sectional, with each section longitudinally extending between respective upright frames of each storage module. In the illustrated embodiment of FIG. 13, the guide rails 102 are also sectional, with each section corresponding to respective storage modules 12a-c and 14a-c for example, although continuous guide rails may also be provided.

Turning now to FIG. 14, each guide rail 102 includes a vertical plate 104, an upper portion of which includes a hook region for latching onto connector beam 34. Each guide rail 102 further includes a guide channel 106 securely coupled to the vertical plate 104. The guide channel 106 extends perpendicularly from the vertical plate 104 and in an opposite direction relative to the hook region of the vertical plate 104. Guide channel 106 is configured to securely receive and guide a side edge of tambour platform 100, such as shown in FIG. 14. As best shown in FIG. 15, tambour platform 100 is continuous, rather than sectional, and includes relatively narrow, articulately interconnected slats that allow the tambour platform 100 to roll or coil and subsequently unroll or uncoil as the tambour platform 100 slides along the guide channel 106. Tambour platform 100 is retractable and extendable on a spiral track system 108 (FIG. 15), and is envisioned to be either hand crank driven or motorized. The spiral track system 108 is configured to automatically reel the tambour platform 100, thereby imparting linear movement to the platform 100 along the rows 12, 14. The spiral track system 108 may be supported by a shaft or bracket 110 secured to the vertical plate 104 (FIG. 14). It will be understood that tambour platform 100 may be slid into the guide channels 106 prior to use, and similarly pulled out of the guide channels 106 for storage, such as shown in FIG. 13.

Figure 20:
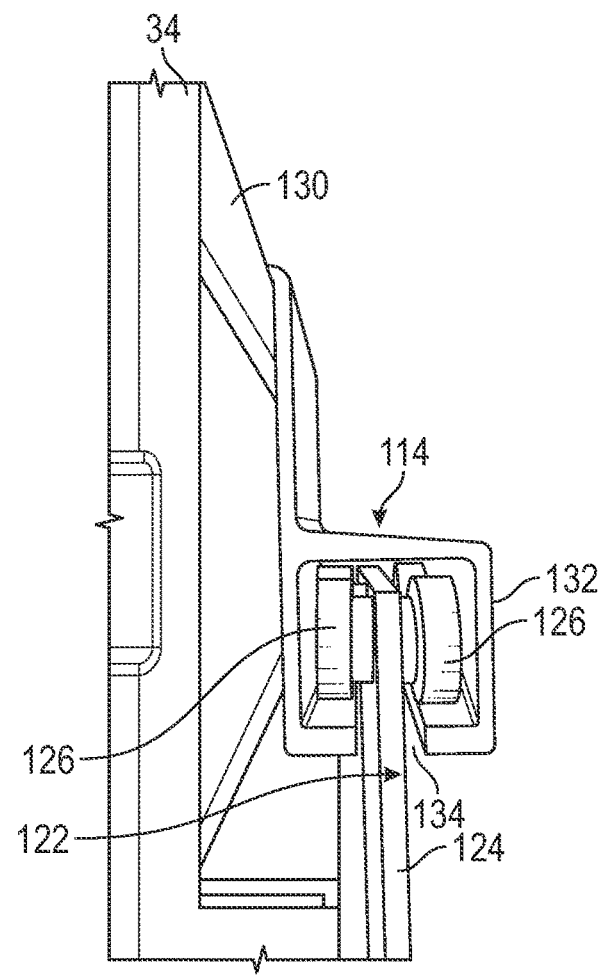
FIG. 20 is a side perspective view of the rolling mechanism engaged with the guide channel of FIG. 19.
Figure 21:
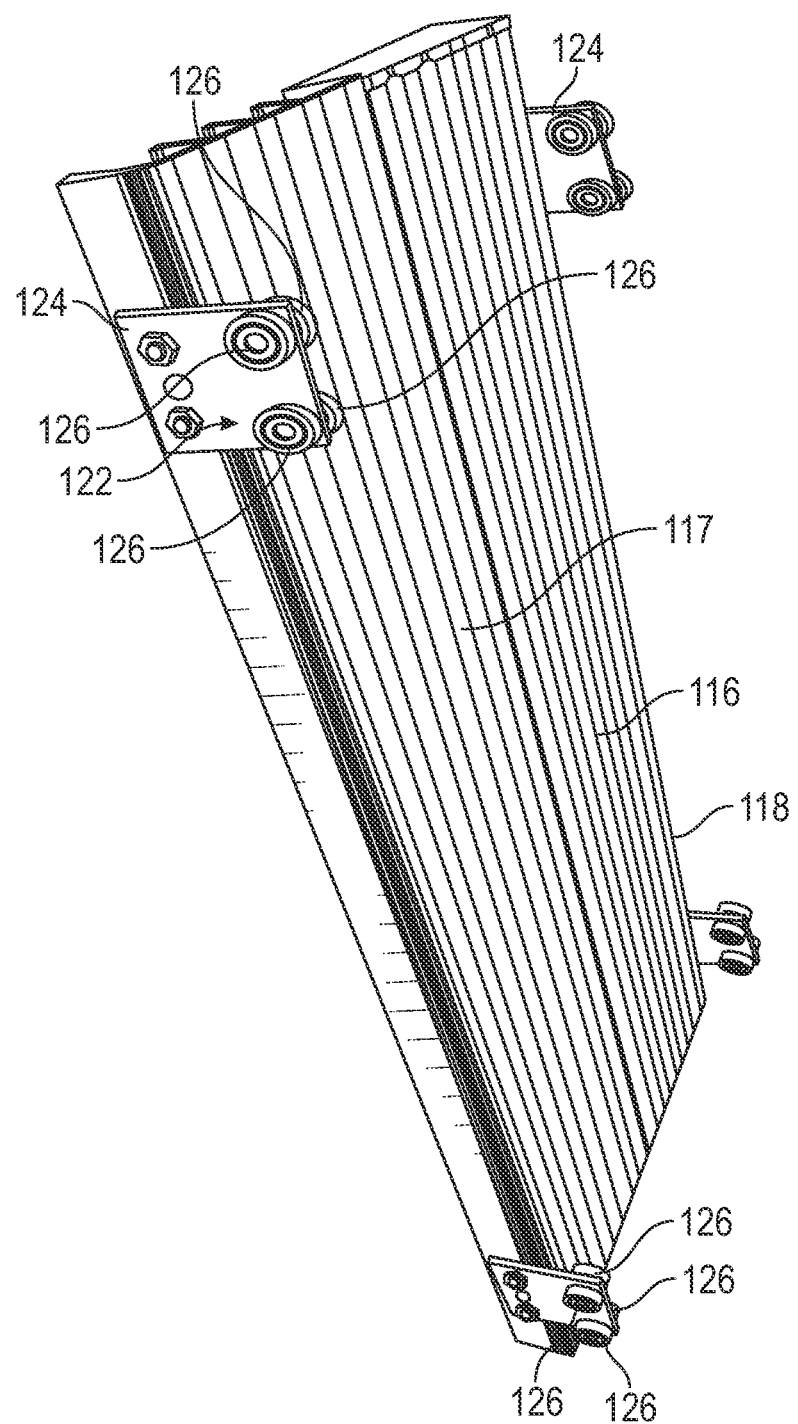
FIG. 21 is a perspective view of a rolling platform that can be substituted for the elevated platforms of the storage assembly of FIG. 1.
Figure 22:
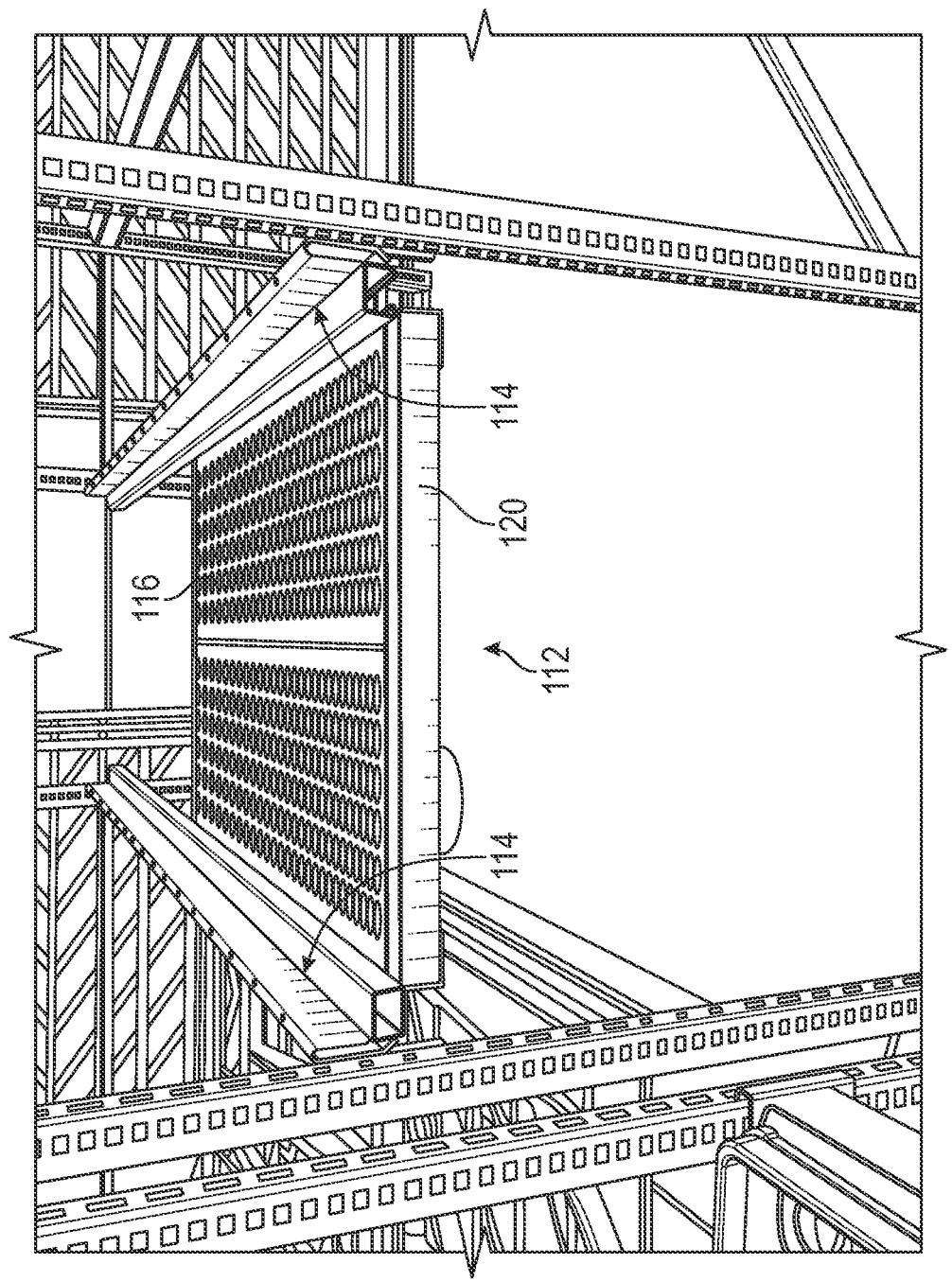
FIG. 22 is a perspective view of the rolling platform of FIG. 16, shown installed along two rails.

With reference to FIGS. 16-22, a sliding/rolling platform 112 can alternatively be used as an elevated catwalk and to interconnect first outer row 12 with middle row 14 and/or to interconnect middle row 14 with second outer row 16. In the illustrated embodiment of FIG. 16, the first and middle rows 12 and 14 are interconnected by the sliding/rolling platform 112, which is adapted to move longitudinally along and between the rows 12 and 14 while being supported by a pair of guide rails 114. Each of the guide rails 114 is either permanently or removably attached to a respective connector beam 34. As discussed above, connector beams 34 are longitudinally disposed along the inner sides of respective rows 12 and 14, and are used to support shelving surfaces 21, 23 of the respective first and middle rows 12 and 14. As described above, each connector beam 34 is sectional, with each section longitudinally extending along respective storage modules 12a-c and 14a-c for example. In the illustrated embodiment of FIG. 16, the guide rails 114 are also sectional, with each section of each guide rail 114 corresponding to respective section of respective connector beam 34. Alternatively, however, continuous guide rails 114 may also be provided, such as shown in FIG. 22.

Figure 17:
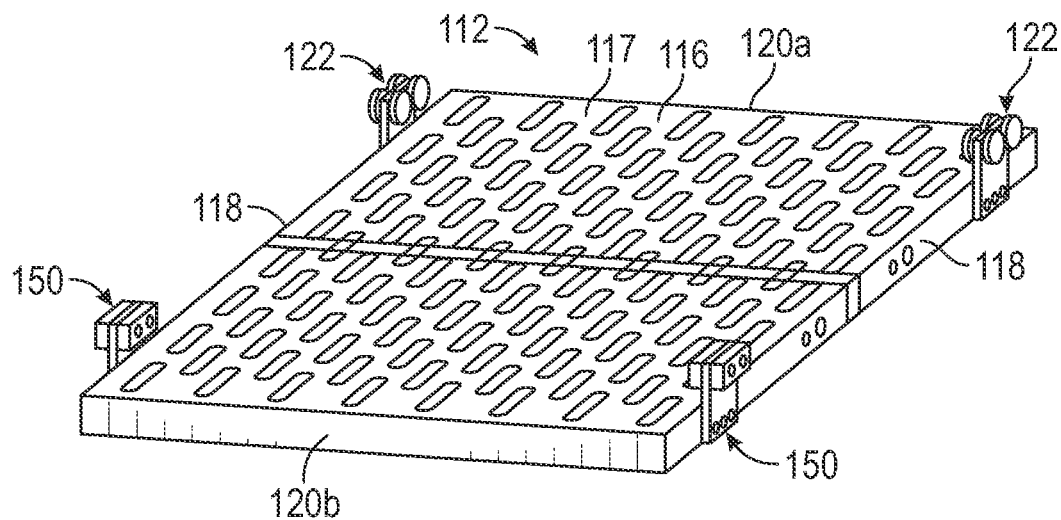
FIG. 17 is a perspective view of a section of the sliding/rolling platform of FIG. 16.
Figure 18:
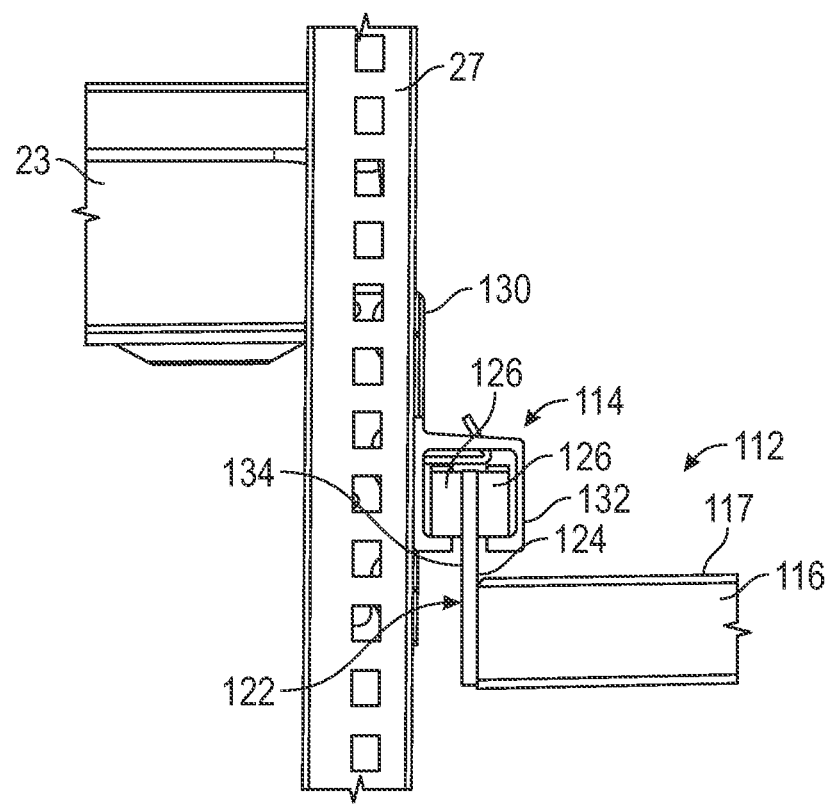
FIG. 18 is a side elevation view of one end of the sliding/rolling platform of FIG. 16.
Figure 19:
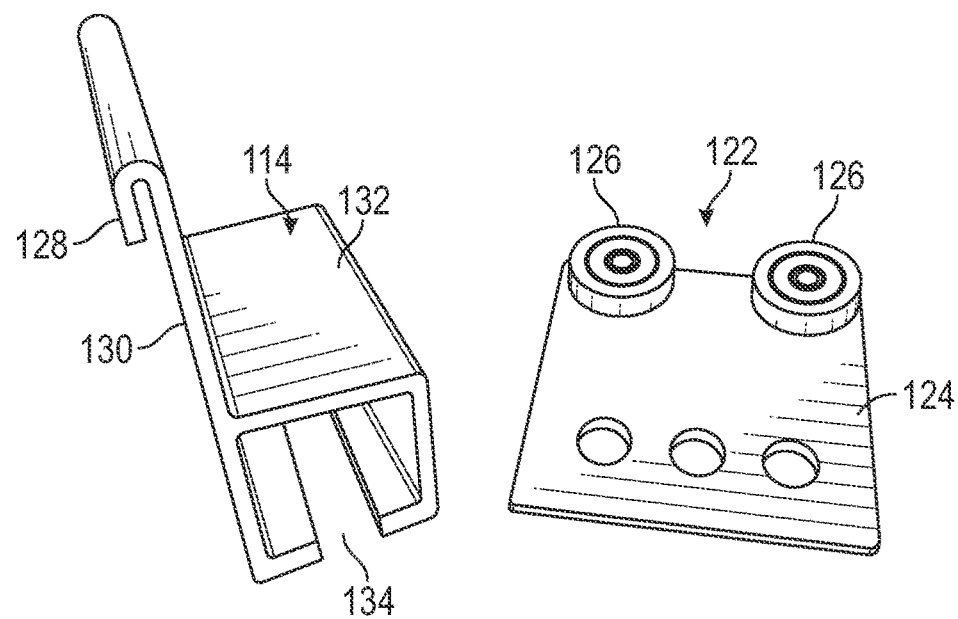
FIG. 19 is a perspective view of a rolling mechanism and a section of a guide channel of the sliding/rolling platform of FIG. 16.

Turning now to FIG. 17, the sliding/rolling platform 112 includes a deck 116 with an upper surface 117, a pair of opposing longitudinally-extending sides 118, and a laterally-extending rolling end 120a and a laterally-extending sliding end 120b. Sliding/rolling platform 112 includes a set of four supports including a pair of rolling mechanisms 122 secured to the longitudinal sides 118 at the rolling end 120a, and pair of slide components 150 secured to the longitudinal sides 118 at the sliding end 120b. As best seen in FIGS. 18-20, each rolling mechanism 122 includes an extension plate 124 that upwardly and perpendicularly extends from the upper surface 117 of the deck 116. A lower end of each extension plate 124 is secured to a respective longitudinal side 118 of deck 116, while an upper end of each extension plate 124 includes a pair of roller wheels 126 secured to both sides of each extension plate 124, such as shown in FIG. 17 and as also shown in the similar embodiment of FIG. 21. As such, each extension plate 124 includes two pairs of parallel roller wheels 126, with each pair separated by the extension plate 124. Thus, the two pairs of parallel roller wheels 126 of each extension plate 124 are disposed above the deck 116, and are received and supported in one of the guide rails 114 as will be described below. Optionally, each roller wheel 126 includes a roller bearing. The sliding/rolling platform's slide components 150 include extension plates 152 that are similar or identical to the extension plates 124 of the rolling mechanisms 122, but are each fitted with a pair of parallel sliders 154 that are separated by the respective extension plates 152.

Each guide rail 114 includes a vertical plate 130, an upper portion of which includes a hook region 128 (FIG. 19) for latching onto a connector beam 34 (FIG. 20). Each guide rail 114 further includes a guide channel 132 securely coupled to the vertical plate 130. The guide channel 132 extends perpendicularly from the vertical plate 130 and in an opposite direction relative to the hook region 128 of the vertical plate 130. Each guide channel 132 securely receives and guides the roller wheels 126 of a respective pair of rolling mechanisms 122, such as shown in FIGS. 18 and 20. As can be best seen in FIGS. 18 and 20, each guide channel 132 has a generally square or rectangular cross-section, and defines an elongated gap 134 in its lower region that extends along the length of each guide channel 132. Gaps 134 are configured to allow extension plates 124, 152 to travel along the guide channels 132 while being downwardly extended out of guide channels 132 to the deck 116 to which they are secured. The use of one set of rolling mechanisms 122 and one set of slide components 150 on the sliding/rolling platform 112 allows a user to shift most of their weight to the deck's rolling end 120a so that the user can manually pull the sliding/rolling platform 112 using their arms and grasping other components of the storage assembly while the sliders 154 lightly resist that movement. Once the sliding/rolling platform 112 is positioned as desired by the user, the user can then shift more of their weight back to the sliding end 120b to increase the frictional engagement of the sliders 154 with the guide channels 122, and thus frictionally hold the sliding/rolling platform 112 in place without undesired rolling.

It is contemplated that sliding/rolling platform 112 is made of lightweight but rigid material, such as aluminum alloy or fiber-reinforced resinous plastic for example. Additionally, deck 116 may have a perforated surface, such as shown in FIGS. 17 and 22, or anti-slip traction tread surface, as shown for example in FIG. 21. The sliding/rolling platform 112 may include multiple sections that can fill the entire longitudinal extent of the modular storage units. It will be understood that sliding/rolling platform 112 may be slid into the guide channels 132 prior to use, and similarly pulled out of the guide channels 132 for storage, such as shown in FIG. 21.

With reference to FIGS. 23-27, a sliding platform 140 can alternatively be used as an elevated catwalk and to interconnect first outer row 12 with middle row 14 and to interconnect middle row 14 with second outer row 16. In the illustrated embodiment of FIG. 23, first and middle rows 12 and 14 are interconnected by the sliding platform 140, which is adapted to slide between the rows 12 and 14 while being supported by a pair of guide rails 142. Each of the guide rails 142 is either permanently or removably attached to a respective connector beam 34. As discussed above, connector beams 34 are longitudinally disposed along the inner sides of respective rows 12 and 14. In the illustrated embodiment of FIG. 23, the guide rails 142 are sectional, with each section of each guide rail 142 corresponding to respective section of the connector beam 34. Alternatively, continuous guide rails may be provided.

Figure 24:
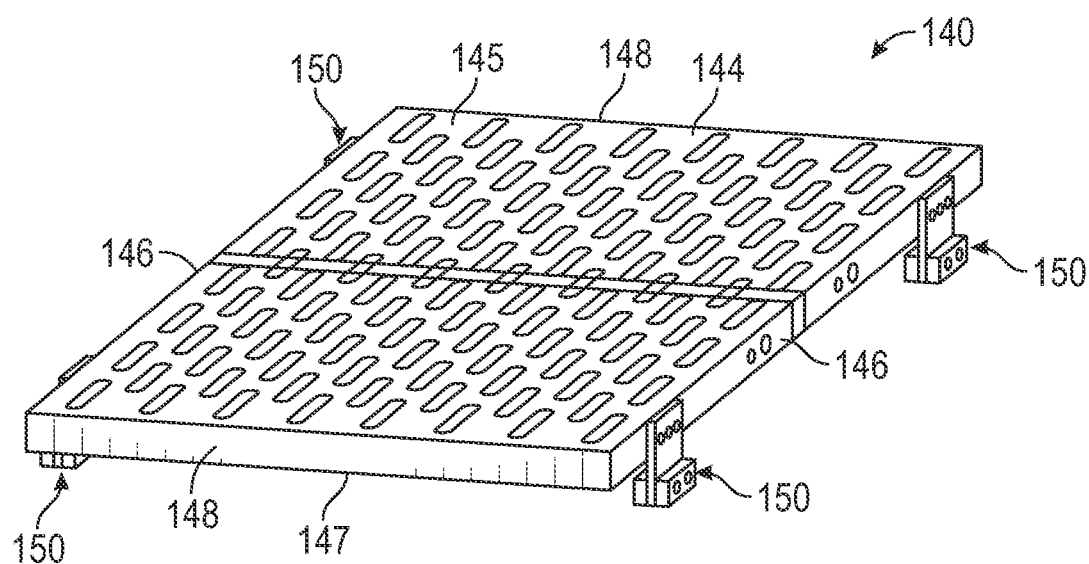
FIG. 24 is a perspective view of the sliding platform of FIG. 23.
Figure 25:
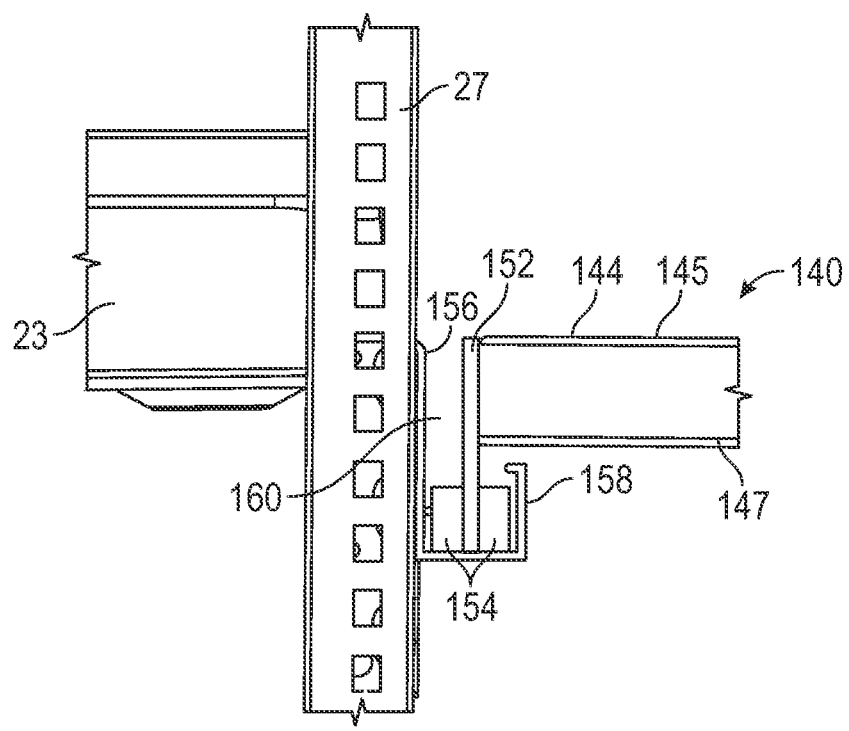
FIG. 25 is a side elevation view of one end of the sliding platform of FIG. 23.

Turning now to FIG. 24, the sliding platform 140 includes a deck 144 with an upper surface 145, a bottom surface 147, a pair of opposing longitudinally-extending sides 146, and a pair of opposing laterally-extending ends 148. Additionally, sliding platform 140 includes a pair of slide components 150 secured to each longitudinal side 146 in longitudinally spaced arrangement. As best seen in FIG. 25, each slide component 150 includes an extension plate 152 that downwardly and perpendicularly extends relative to the upper surface 145 and below the bottom surface 147 of the deck 144. An upper end of each extension plate 152 is secured to a respective longitudinal side 146 of deck 144, while opposing lower end of each extension plate 152 includes a pair of sliders 154 secured to each side of each extension plate 152 (FIG. 25). As such, the lower end of each extension plate 152 includes a pair of parallel sliders 154 that are separated by the extension plate 152. The sliders 154 of each extension plate 152 are therefore disposed below the bottom side 147 of the deck 144, and are received and supported in a respective one of the guide rails as will be described below in more detail. Each slider 154 is envisioned to be made of or coated with a material with a low coefficient of friction, such as polytetrafluoroethylene or polyimide for example.

Figure 23:
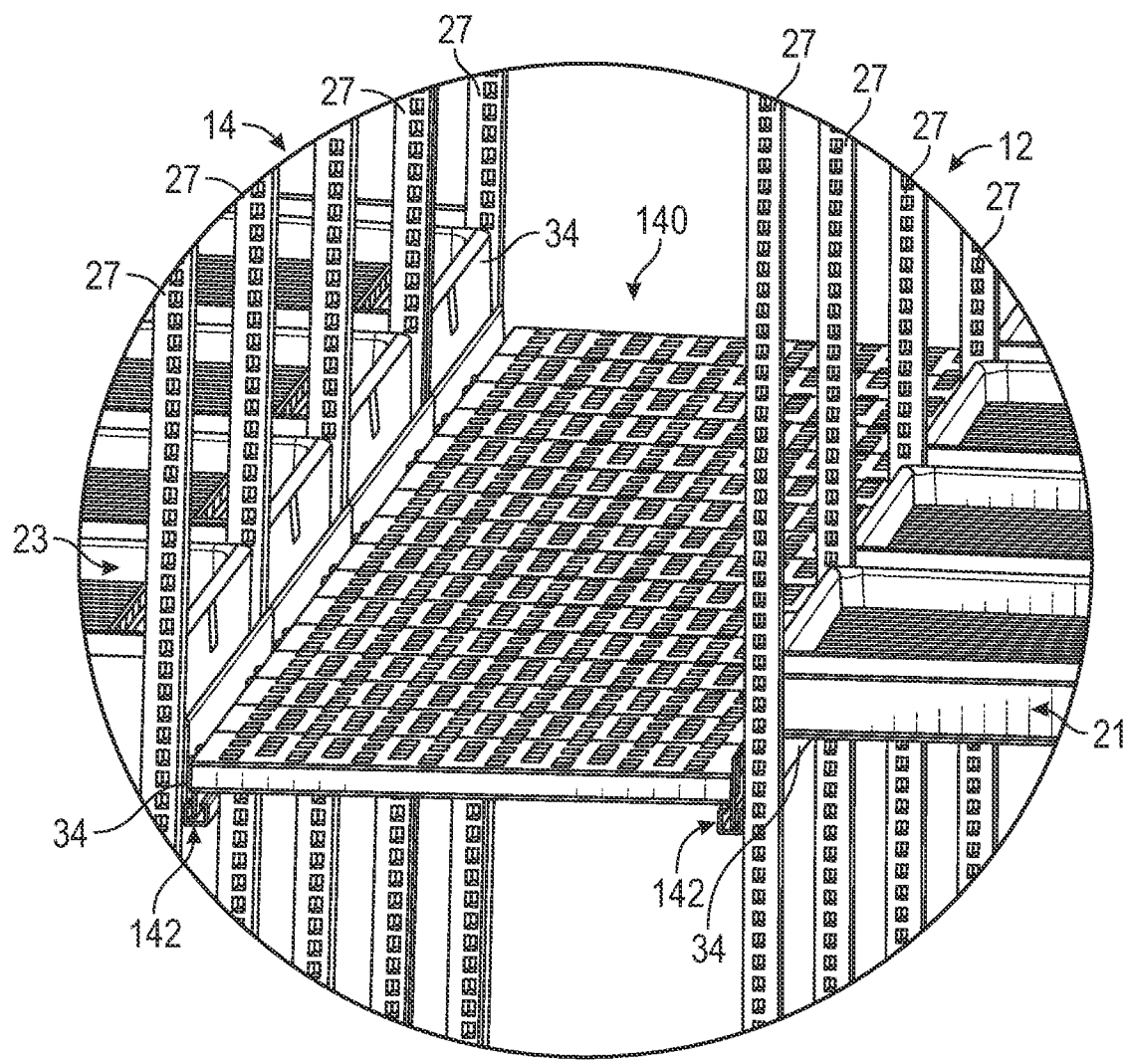
FIG. 23 is a perspective view of a sliding platform that can be substituted for the elevated platforms of the storage assembly of FIG. 1.

Each guide rail 142 includes a vertical plate 156, an upper portion of which includes a hook region for latching onto a connector beam 34 (FIG. 23). Each guide rail 142 further includes a guide channel 158 securely coupled to the vertical plate 156. The guide channel 158 extends perpendicularly from the vertical plate 156 and in an opposite direction relative to the hook region of the vertical plate 156. Each guide channel 158 securely receives and guides the sliders 154 of a respective pair of slide components 150, such as shown in FIG. 25. As can be best seen in FIG. 25, each guide channel 158 has a generally square or rectangular cross-section, and defines an elongated gap or slot 160 in its upper region that extends along the length of each guide channel 158. Gap 160 allows extension plates 152 to travel along guide channel 158 while being upwardly extended out of guide channel 158 to the deck 144 with which the extension plates 152 are securely connected.

Figure 26:
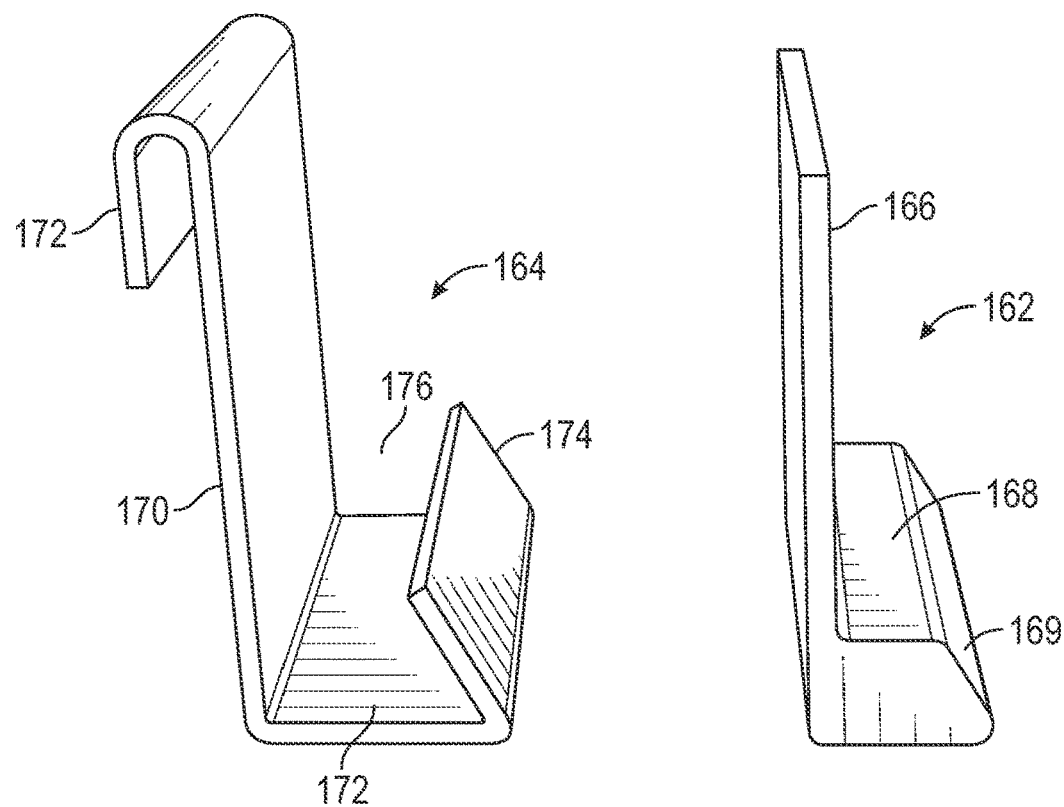
FIG. 26 is a perspective view of an alternative slide component and a section of an alternative guide rail.
Figure 27:
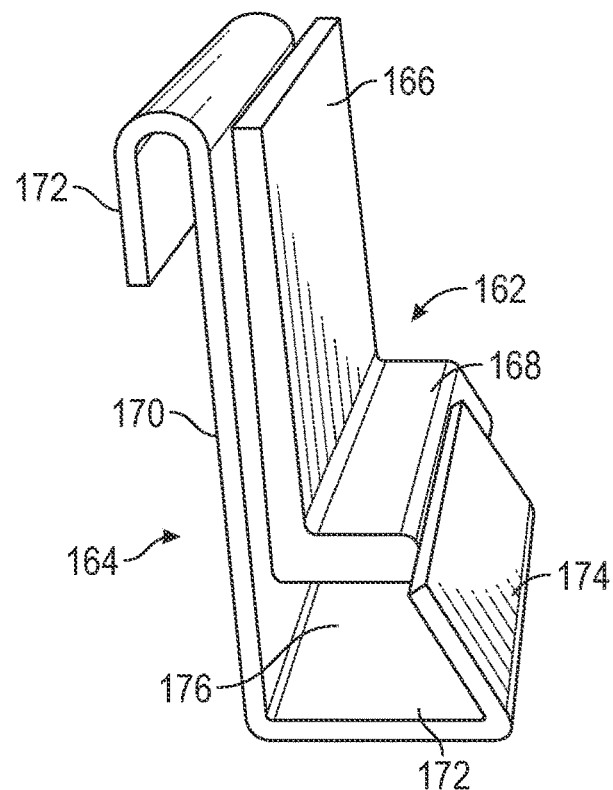
FIG. 27 is a perspective view of the slide component and the section of the guide rail of FIG. 26, shown in an engaged arrangement.
Figure 28:
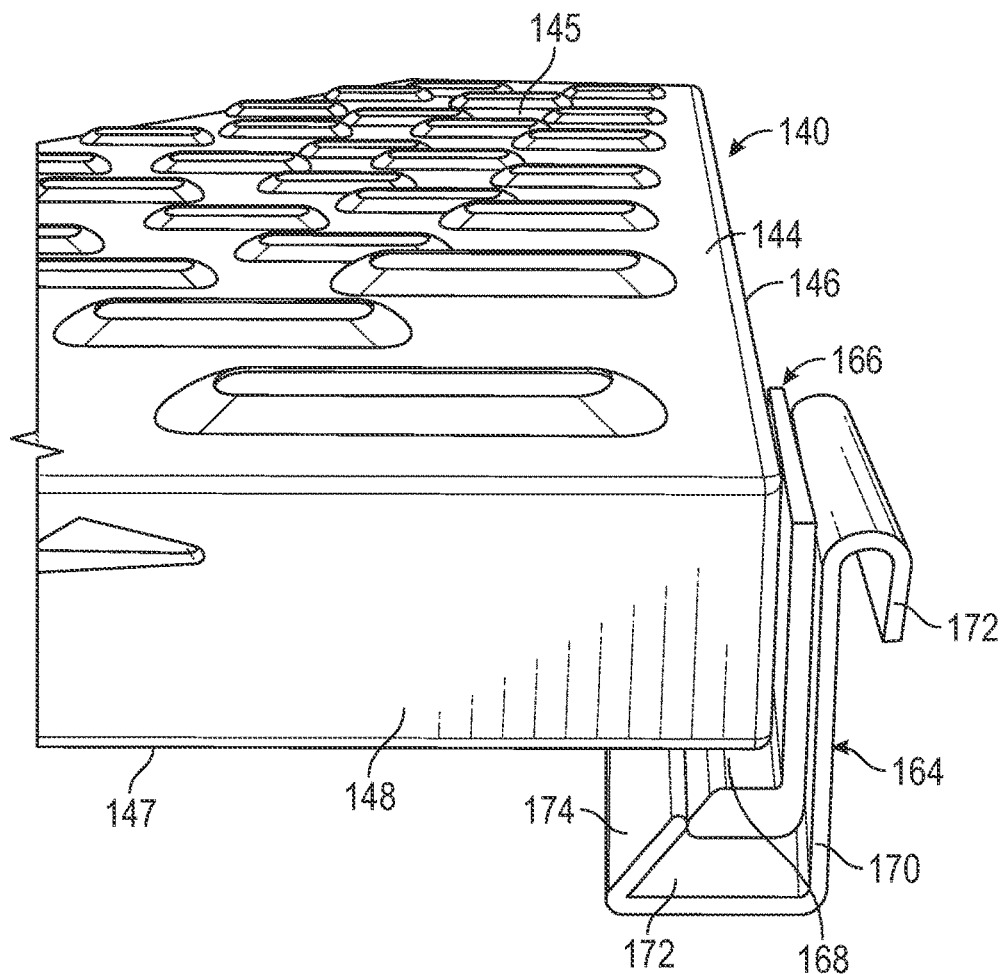
FIG. 28 is an enlarged perspective view of the slide component engaged with the section of the guide rail of FIG. 26, shown supporting a section of the sliding platform of FIG. 23.

Alternative slide components may include an L-shaped slide bracket 162 configured to fit and slide along a pair of modified-S shaped guide rails 164, such as shown in FIGS. 26-28. The modified-S shaped guide rail 164 may be used to support the slide platform 140 when fitted with L-shaped slide brackets 162. Similar to each slide component 150 described above, the L-shaped slide bracket 162 includes an extension plate 166 that extends downwardly and perpendicularly relative to the upper side 145 of the deck 144. An upper end of the extension plate 166 is secured to respective longitudinal side 146 of deck 144. A lower end of the extension plate 166 includes a slide bar 168 that extends perpendicularly from the extension plate 166 and supports deck 144, as shown in FIG. 28. A distal end 169 of the slide bar 168 is chamfered to fit the guide rail 164, as shown in FIGS. 26 and 27.

Similar to the guide rail 142 described above, the modified-S shaped guide rail 164 includes a vertical plate 170, an upper portion of which includes a hook region 172 for latching onto connector beam 34. Guide rail 164 further defines an elongated guide channel 172 for receiving and guiding the slide bar 168, such as shown in FIGS. 27 and 28. The guide channel 172 extends perpendicularly from the vertical plate 170 and in an opposite direction relative to the hook region 172. As shown in FIGS. 26 and 27, the guide channel 172 defines an elongate gap or slot 176 in its upper region, extending along the length of the guide channel 172. Slot allows the extension plate 166 to travel along the guide channel 172 while being upwardly extended out of the guide channel 172 to the deck 144. A distal end 174 of the guide channel 172 is bent upwardly and angled towards the vertical plate 170. The bend of the distal end 174 corresponds in shape to the chamfered side 169 of the slide bar 168, such that the slide bar 168 of the slide bracket 162 can only be longitudinally inserted into the guide channel 172, rather than lowered into the guide channel 172 from above. This feature provides for secured engagement of the slide bracket 162 with the modified-S shaped guide rail 164, and prevents the attached platform from being lifted away from the guide rail 164.

It is contemplated that sliding platform 140 is made of lightweight but rigid material, such as aluminum alloy or fiber-reinforced resinous plastic for example. Additionally, the upper panel or surface 145 of the deck 144 may have a perforated surface, such as shown in FIGS. 24 and 28, or anti-slip traction tread surface. The sliding platform 140 may include multiple sections that can fill the entire longitudinal extent of the modular storage units. Prior to use, sliding platform 140 may be slid into the guide channels 158, or alternatively into the guide channels 172, and similarly may be pulled out of the guide channels 158 or 172 for storage.

Figure 29:
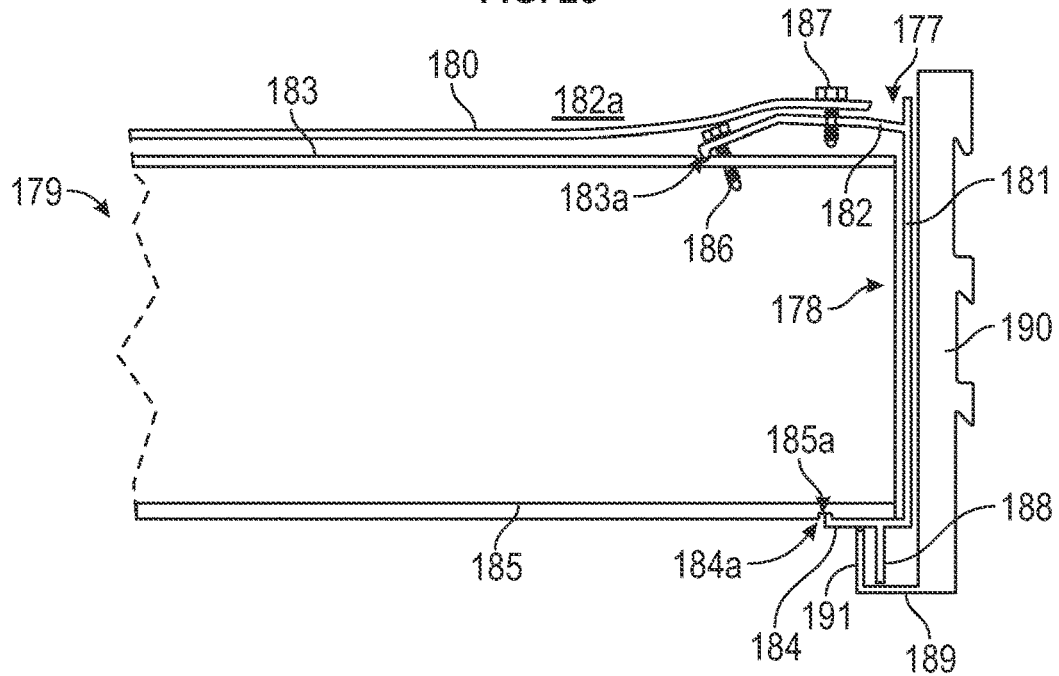
FIG. 29 is a side elevation view of another slide component and guide rail.

Optionally, and with reference to FIG. 29, a pair of platform side beams 177 (only one of which is shown in FIG. 29) are used as the slide components for a slide platform. Each mounting bracket 177 covers and longitudinally extends along respective ends 178 of laterally-aligned I-beams 179 that support an upper standing surface 180 to form a deck. Each platform side beam 177 includes an upright leg 181 that extends along and outboard of the I-beam ends 146, an upper shoulder 182 that extends inboard from the upright leg 181 and over upper webs 183 of the I-beams 179, and a lower shoulder 184 that extends inboard from the upright leg 181 and below lower webs 185 of the I-beams 179. In the illustrated embodiment, the upper shoulder 182 and lower shoulder 184 have respective distal end portions 182a, 184a that engage respective notches 183a, 185a formed in the upper and lower webs 183, 185 of the I-beam 179, to aid in assembling the deck by at least temporarily securing the platform side beams 177 to the I-beams 179. The distal end 184a of the lower shoulder 184 is upwardly curved or bent to engage the notch 185a formed in the lower web 185, and the distal end 182a of the upper shoulder 182 is downwardly curved or bent to engage the notch 183a formed in the upper web 183. The platform side beams 177 are further secured to the I-beams 179 using fasteners 186 that extend through the distal end portion 182a of the upper shoulder 182 and threadedly engage the I-beam's upper web 183. Additional fasteners 187 are used to secure the upper standing surface 180 to the side beams' upper shoulders 182.

A downwardly-extending support fin 188 extends from the lower shoulder 184 to engage and slide along a guide channel 189 formed by an L-shaped guide rail 190 that is used to support each side of the platform. An upwardly-extending support fin 191 is formed at a distal end of the L-shaped guide rail 190 and slides along a lower surface of the side beam's lower shoulder 184. Therefore, it will be appreciated that each platform side beam 177 has two elongate contact regions with the respective L-shaped guide rail 190. Optionally, wear strips or slide blocks are provided at the interfaces where the downwardly-extending support fin 188 engages the guide channel 189, and where the upwardly-extending support fin 191 engages the lower shoulder 184.

Figure 30A:
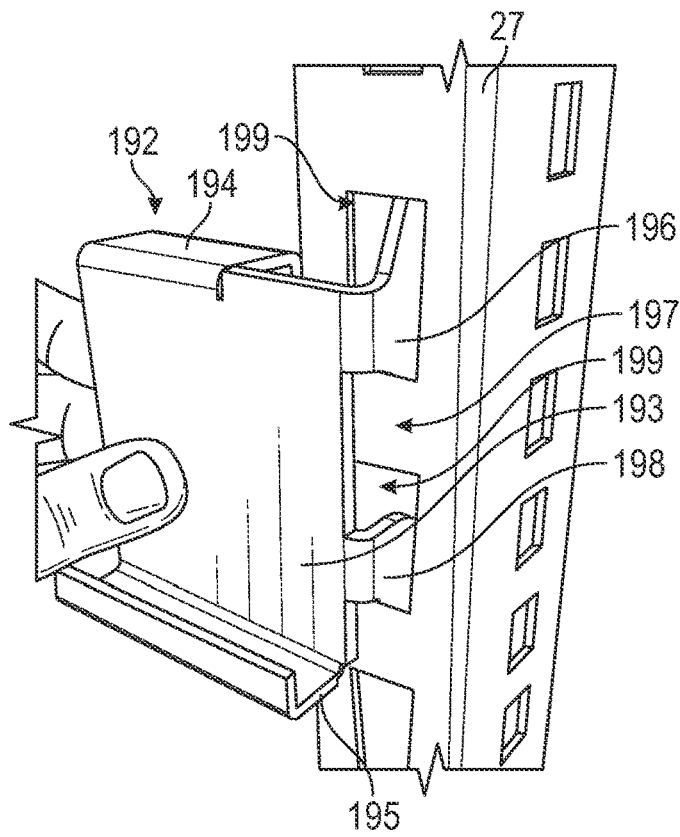
FIG. 30A is a perspective view of a section of an alternative guide rail, shown secured to a frame member of the storage assembly of FIG. 1.
Figure 30B:
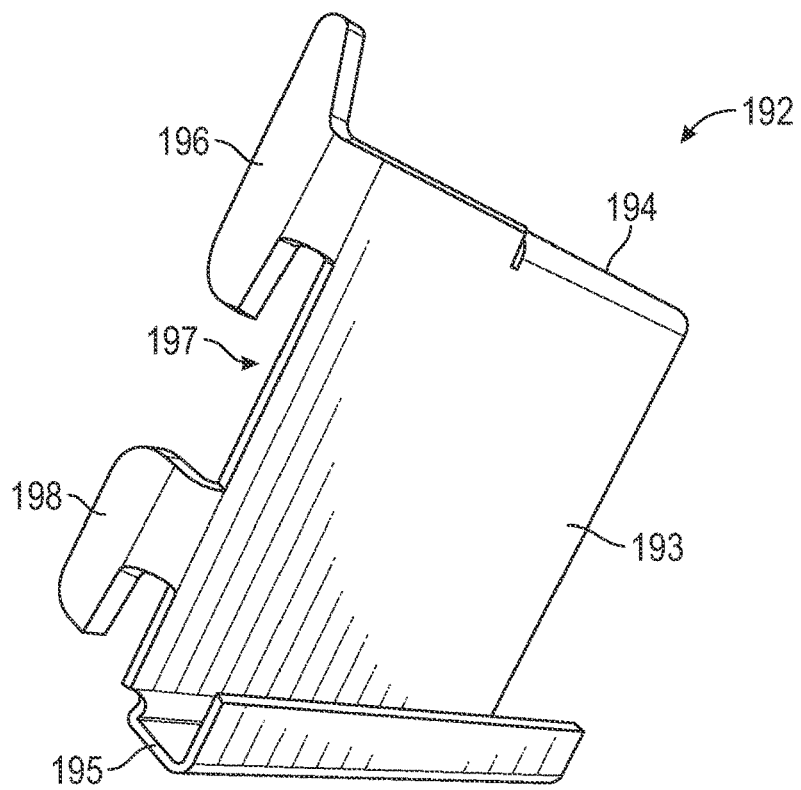
FIG. 30B is a perspective view of the section of the alternative guide rail of FIG. 30A.

It is further contemplated that guide rails for supporting platforms, such as slide platforms 140, may include additional safety features that will prevent the guide rails from disengaging connector beam 34 and/or frame member 27 to which they are attached. As shown in FIGS. 30A and 30B, an alternative guide rail 192 extends along each of two adjacent rows, such as the first row 12 and middle row 14, for supporting a platform (not shown). The guide rail 192 includes a vertical plate 193, an upper portion of which includes a hook region 194 for latching onto connector beam 34. Guide rail 192 further defines a guide channel 195 for receiving and guiding one of the slide components of the platform, such as the slide platform 140 that is described above, although the guide channel may be shaped to accommodate any platform as desired. The guide channel 195 extends perpendicularly from the vertical plate 193 and in an opposite direction relative to the hook region 194. The vertical plate 193 includes end portions 197 having a T-shaped upper tab 196 and a downwardly-curving lower tab 198, which tabs are received by respective spaced openings 199 along frame member 27 (FIG. 30A). Both the upper and lower tabs 196, 198 extend perpendicularly relative to the vertical plate 193 and in an opposite direction relative to the guide channel 195. The upper tab 196 and lower tab 198 are sized and shaped to prevent removal of the guide rail 192 when a platform is mounted along two spaced-apart guide rails 192 of adjacent rows. With a platform installed, if one of the guide rails were moved up, an upper end portion of the T-shaped upper tab 196 engages the frame member 27 at and above the opening that receives the upper tab to thereby retain an upper end of the guide rail 192 at the frame member 27, while the platform (not shown in FIG. 30A or 30B) prevents the lower end of the guide rail 192 from moving inboard toward the platform, which movement could otherwise permit the lower tab 198 to disengage the frame member 27 at the lower opening that receives the lower tab 198. One the platform is removed, the guide rail 192 can be lifted up to the extent permitted by the tabs 196, 198, and then the rail's lower end and lower tabs 198 may be tilted inboard away from the frame member 27, followed by downward and diagonal movement of the guide rail 192 to disengage the upper tabs 196 from the frame member 27.

Figure 31:
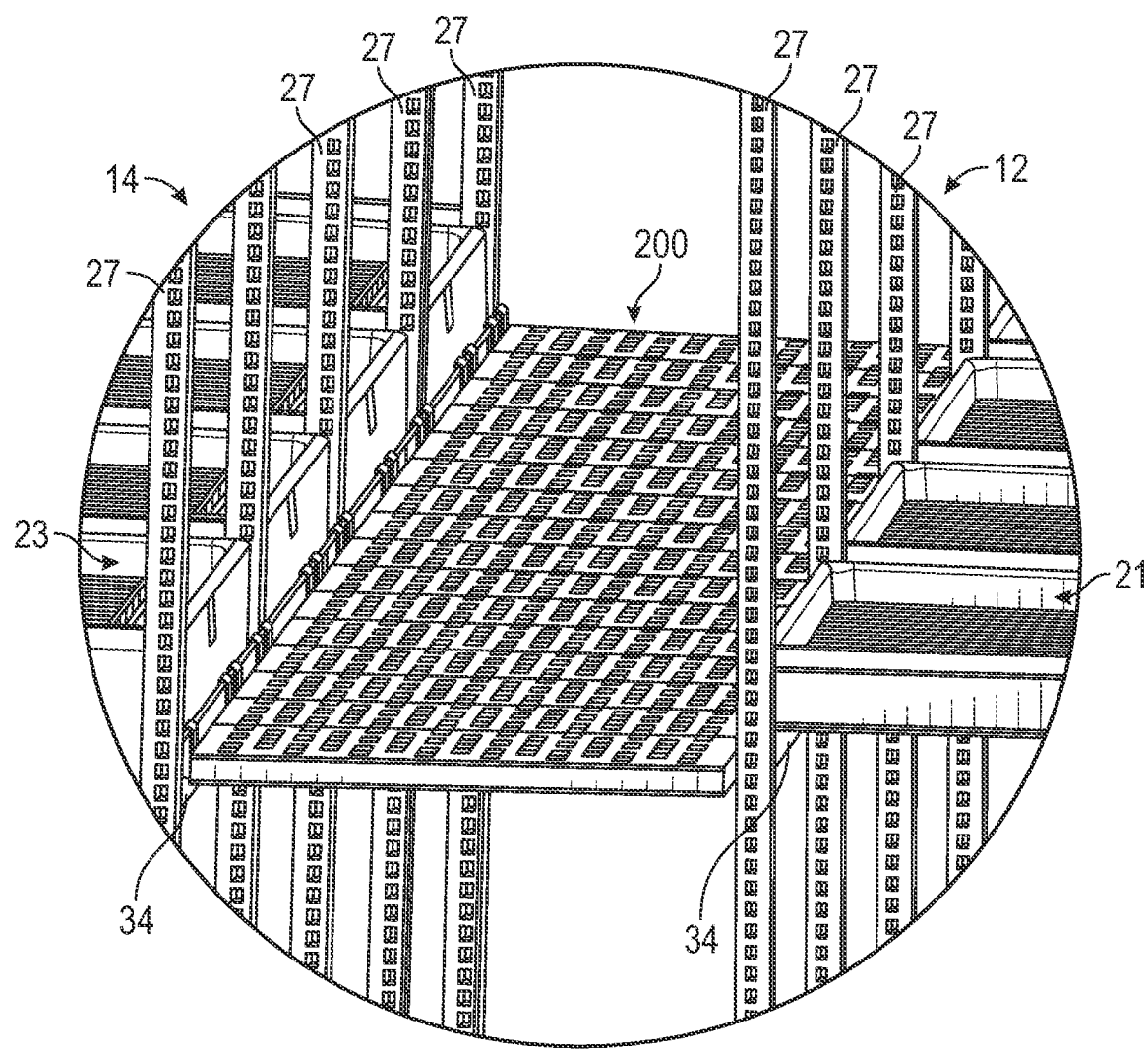
FIG. 31 is a perspective view of a static platform that can be substituted for the elevated platforms of the storage assembly of FIG. 1.
Figure 32:
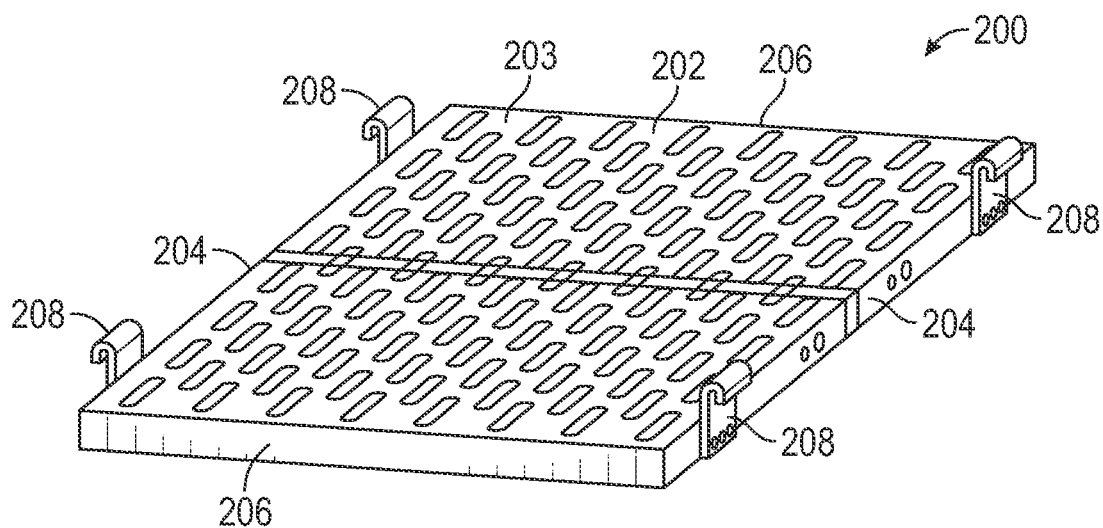
FIG. 32 is a perspective view of a section of the static platform of FIG. 31.
Figure 33:
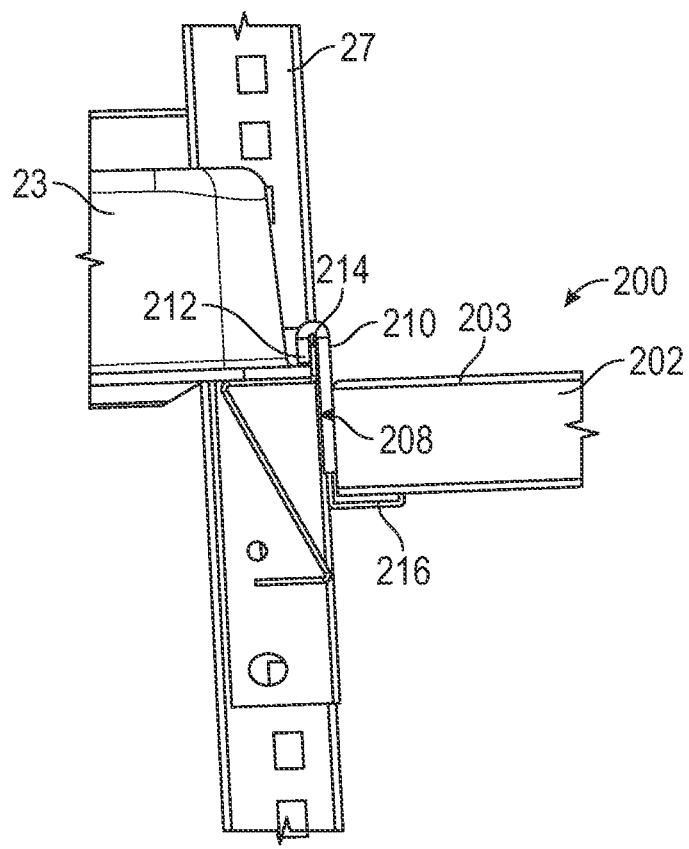
FIG. 33 is a side elevation view of one end of the static platform of FIG. 31.

With reference to FIGS. 31-33, a static platform 200 can be used as an elevated catwalk and to interconnect first outer row 12 with middle row 14 and to interconnect middle row 14 with second outer row 16. In the illustrated embodiment of FIG. 31, the first and middle rows 12 and 14 are interconnected by the static platform 200, which is adapted to removably mount onto respective connector beams 34 that are longitudinally disposed along the inner sides of respective rows 12 and 14.

Turning now to FIG. 32, the static platform 200 includes a deck 202 with an upper surface 203, a pair of opposing longitudinally-extending sides 204, and a pair of opposing laterally-extending ends 206. Additionally, static platform 200 includes a pair of hang plates 208 secured to each longitudinal side 204 in longitudinally spaced arrangement. As best seen in FIG. 33, each hang plate 208 includes an extension plate 210 that extends upwardly and perpendicularly relative to the upper side 203 of the deck 202. An upper end of each extension plate 210 includes a hook region 212 for latching onto a lip 214 of a respective connector beam 34 (FIG. 33). A lower end of each extension plate 210 is secured to a respective longitudinal side 204 of deck 202. As such, the hook region 212 at the upper end of each extension plate 210 is disposed above the upper side 203 of the deck 202. Each hang plate 208 further includes a support member 216 disposed at the lower end of each extension plate 210. Support member 216 extends perpendicular to the extension plate 210 in an opposite direction relative to the hook region 212. As shown in FIG. 33, support member 216 of each hang plate 208 provides horizontal support for the deck 202 when static platform 200 is hooked onto connector beams 34.

It is contemplated that static platform 200 is made of lightweight but rigid material, such as aluminum alloy or fiber-reinforced resinous plastic for example. Additionally, deck 202 may have a perforated surface, such as shown in FIGS. 31 and 32, or anti-slip traction tread surface. The static platform 200 may include multiple sections that can fill the entire longitudinal extent of the modular storage units, as shown in FIG. 31. It will be understood that static platform 200 may be lowered to hook onto the lip 214 of the connector beams 34 prior to use, and lifted to disengage the hook region 212 with the lip 214 to remove the static platform 200 for storage.

The embodiments described herein thus provide longitudinally extended and laterally movable rows of modular storage units. The rows are parallel to one another and laterally movable along a floor or other support surface, such that the rows are connectable to form a collapsed or compact storage assembly and movable apart to form individual rows of the modular storage units for easy access via areas temporarily formed between the rows of the storage units. Whenever the rows are moved apart by a predetermined distance, the rows are selectively inter-connectable by a platform providing an elevated surface or a catwalk for easy access to shelf space of the storage units that is spaced well above the ground. When any two rows are inter-locked by the platform, the two rows can only laterally move together (unless secured against movement by another locking device such as a wheel brake or chock), but cannot move independently along the floor or other support surface. The modular structure of the storage units allows for longitudinal shortening or extending each row of the storage units. While it will be appreciated that the foregoing description has been with reference to a three-row storage assembly 12, 14, and 16, the present invention is equally applicable to other multi-row storage assemblies, such as two-row, four-row, and so on.

Changes and modifications in the specifically described embodiments may be carried out without departing from the principles of the present invention, which is intended to be limited only by the scope of the appended claims, as interpreted according to the principles of patent law including the doctrine of equivalents.

The embodiments of the invention in which an exclusive property or privilege is claimed are defined as follows:

1. A storage rack system comprising:
 first and second pairs of upright frame pieces configured to be positioned in horizontally spaced-apart arrangement, said upright frame pieces each defining a plurality of openings in vertically spaced arrangement, and said second pair of upright frame pieces spaced apart from said first pair of upright frame pieces to define a walking space therebetween;
 first and second lateral rails each having an elongate plate extending between opposite end portions that are configured to engage selected ones of said openings defined in said upright frame pieces so that said first lateral rail couples said first pair of upright frame pieces together and said second lateral rail couples said second pair of upright frame pieces together;
 said opposite end portions of said first and second lateral rails each comprising:
  a T-shaped upper tab extending rearwardly from said elongate plate, said upper tab having an upper end portion extending upwardly and a downward end portion extending downwardly away from said upper end portion; and
  a lower tab spaced below said upper tab and extending rearwardly from said elongate plate, said lower tab having a downward end portion extending downwardly;
  wherein said upper and lower tabs at each of said opposite end portions are simultaneously insertable into respective upper and lower ones of said openings along respective ones of said upright frame pieces, and lowerable so that said downward end portions of said upper and lower tabs secure said lateral rail to said upright frame pieces; and
  wherein said upper end portions of said upper tabs engage said upright frame pieces above said upper openings upon upward movement of said lateral rail to prevent removal of said upper tabs from said upper openings; and
 a platform having a planar walking surface and a pair of supports at opposite sides of said planar walking surface, said supports extending vertically away from said planar walking surface;
 wherein said platform is positionable with said supports engaging respective ones of said lateral rails so that said platform spans across said walking space; and
 wherein said platform secures said first lateral rail and said first pair of upright frame pieces to said second lateral rail and said second pair of upright frame pieces.

2. The storage rack system of claim 1, wherein said upper end portions of said upper tabs are tapered in the upward direction so that said upper end portions of said upper tabs do not engage said upright frame pieces when respective ones of said lateral rails are lowered with said downward end portions of said upper and lower tabs securing said lateral rails to respective ones of said upright frame pieces.

3. The storage rack system of claim 2, wherein said lower tabs are removable from said lower openings when said lateral rails are moved upwardly to engage said upper tabs with respective ones of said upright frame pieces above said upper openings.

4. The storage rack system of claim 3, wherein said upper tabs are removable from said upper openings only after (i) said lateral rails are moved upwardly to engage said upper tabs with respective ones of said upright frame pieces above said upper openings and (ii) said lower tabs are removed from said lower openings.

5. The storage rack system of claim 1, wherein said platform is configured to obstruct movement of said lateral rails toward one another upon upward movement of said lateral rails and disengagement of said downward end portions of said lower tabs from respective ones of said upright frame pieces at said lower openings.

6. The storage rack system of claim 1, wherein said lateral rails each comprise an elongate guide channel configured to receive a respective portion of a platform.

7. The storage rack system of claim 6, wherein said elongate plate is oriented vertically and said guide channel extends horizontally forwardly from a lower end portion of said elongate plate.

8. The storage rack system of claim 7, wherein said guide channels each comprise an upwardly-facing open region for receiving the respective portions of the platform.

9. The storage rack system of claim 8, wherein said platform obstructs movement of said lateral rails toward one another upon upward movement of said lateral rails and disengagement of said downward end portions of said lower tabs from said upright frame pieces at said lower openings.

10. The storage rack system of claim 9, wherein said upper end portions of said upper tabs are tapered in the upward direction so that said upper end portions of said upper tabs do not engage said upright frame pieces when said lateral rails are lowered with said downward end portions of said upper and lower tabs securing said lateral rails to said upright frame pieces, and wherein said lateral rails are removable from said upright frame pieces only after disengagement of said platform from said lateral rails.

11. The storage rack system of claim 10, wherein said lower tabs are removable from said lower openings when said lateral rails are moved upwardly to engage said upper tabs with said upright frame pieces above said upper openings.

12. The storage rack system of claim 11, wherein said upper tabs are removable from said upper openings only after (i) said lateral rails are moved upwardly to engage said upper tabs with said upright frame pieces above said upper openings, and (ii) said lower tabs are removed from said lower openings.

13. A storage rack system comprising:
a pair of racks supported on a floor surface in spaced-apart arrangement, wherein at least one of said racks is movable along the floor surface toward and away from the other of said racks, each of said racks comprising:
a pair of upright frame pieces configured to be positioned in horizontally spaced-apart arrangement, said upright frame pieces each defining a plurality of openings in vertically spaced arrangement;
a lateral rail having an elongate plate and a guide channel extending between opposite end portions that are configured to engage selected ones of said openings defined in said upright frame pieces so that said lateral rail couples said upright frame pieces together, wherein said guide channel extends along an outboard-facing surface of said elongate plate;
said opposite end portions of said lateral rail comprising:
a T-shaped upper tab extending rearwardly from said elongate plate, said upper tab having an upper end portion extending upwardly and a downward end portion extending downwardly away from said upper end portion; and
a lower tab spaced below said upper tab and extending rearwardly from said elongate plate, said lower tab having a downward end portion extending downwardly;
wherein said upper and lower tabs at each of said opposite end portions are simultaneously insertable into respective upper and lower ones of said openings along respective ones of said upright frame pieces, and lowerable so that said downward end portions of said upper and lower tabs secure said lateral rail to said upright frame pieces; and
wherein said upper end portions of said upper tabs engage said upright frame pieces above said upper openings upon upward movement of said lateral rail to prevent removal of said upper tabs from said upper openings;
a platform having opposite edge regions received in said guide channels of respective ones of said lateral rails so that said platform is supported by said lateral rails at said guide channels when said racks are spaced apart to form a walking space, said platform having a planar walking surface spanning said walking space;
wherein said platform couples said racks together at said lateral rails and prevents movement of said lateral rails toward and away from said walking space; and
said lateral rails are removable from said upright frame pieces only after disengagement of said platform from at least one of said lateral rails.

14. The storage rack system of claim 13, wherein said upper end portions of said upper tabs are tapered in the upward direction so that said upper end portions of said upper tabs do not engage said upright frame pieces when said lateral rails are lowered with said downward end portions of said upper and lower tabs securing said lateral rails to said upright frame pieces.

15. The storage rack system of claim 13, wherein said lower tabs are removable from said lower openings when said lateral rails are moved upwardly to engage said upper tabs with said upright frame pieces above said upper openings.

16. The storage rack system of claim 15, wherein said upper tabs are removable from said upper openings only after (i) said lateral rails are moved upwardly to engage said upper tabs with said upright frame pieces above said upper openings, and (ii) said lower tabs are removed from said lower openings.

17. The storage rack system of claim 15, wherein said elongate plates are oriented vertically and said guide channels extend horizontally forwardly from lower end portions of said elongate plates.

18. The storage rack system of claim 17, wherein said platform comprises a pair of supports at opposite sides of said planar walking surface, said supports extending downwardly away from said planar walking surface, wherein said guide channels comprise upwardly-facing open regions for receiving respective ones of said supports, and wherein said supports are movable along said guide channels.

* * * * *